(12) United States Patent
Komori et al.

(10) Patent No.: US 8,361,400 B2
(45) Date of Patent: Jan. 29, 2013

(54) HONEYCOMB STRUCTURAL BODY

(75) Inventors: Teruo Komori, Gifu (JP); Kazushige Ohno, Gifu (JP); Sungtae Hong, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/242,101

(22) Filed: Sep. 23, 2011

(65) Prior Publication Data

US 2012/0031062 A1 Feb. 9, 2012

Related U.S. Application Data

(63) Continuation of application No. 10/516,328, filed as application No. PCT/JP2004/008816 on Jun. 23, 2004, now Pat. No. 8,062,603.

(30) Foreign Application Priority Data

Jun. 23, 2003 (JP) ................................. 2003-178713

(51) Int. Cl.
*B01D 50/00* (2006.01)
(52) U.S. Cl. ....................................................... 422/180
(58) Field of Classification Search .................. None
See application file for complete search history.

(56) References Cited

U.S. PATENT DOCUMENTS

| 4,276,071 A | 6/1981 | Outland |
| 4,364,761 A | 12/1982 | Berg et al. |
| 4,416,676 A | 11/1983 | Montierth |
| 4,417,908 A * | 11/1983 | Pitcher, Jr. ....................... 55/523 |
| 4,420,316 A | 12/1983 | Frost et al. |
| 4,632,683 A | 12/1986 | Fukutani et al. |
| 4,643,749 A | 2/1987 | Miura |
| 4,857,089 A | 8/1989 | Kitagawa et al. |
| 5,733,352 A | 3/1998 | Ogawa et al. |
| 5,914,187 A | 6/1999 | Naruse et al. |
| 5,930,994 A | 8/1999 | Shimato et al. |
| 6,395,370 B1 | 5/2002 | Noda et al. |

(Continued)

FOREIGN PATENT DOCUMENTS

| EP | 0 450 899 A2 | 10/1991 |
| EP | WP 0 450 899 A2 | 10/1991 |

(Continued)

OTHER PUBLICATIONS

S. Ichikawa, et al., "Material Development of High Porous SiC for Catalyzed Diesel Particulate Filters", 2003 SAE World Congress, Mar. 3-6, 2003, pp. 1-8.

(Continued)

*Primary Examiner* — Tom Duong
(74) *Attorney, Agent, or Firm* — Oblon, Spivak, McClelland, Maier & Neustadt, L.L.P.

(57) ABSTRACT

An object of the present invention is to provide a honeycomb structural body which is low in pressure loss and can prolong a period up to a regenerating process. The present invention is directed to a columnar honeycomb structural body comprising a large number of through holes placed in parallel with one another in a length direction with wall portion interposed therebetween, wherein: each of the through holes has one of ends sealed; one end face of the through hole differs in opening area from the other end face thereof; a ceramic material which constitutes the wall portion has an average pore diameter in a range from 5 to 30 μm; and the rate of capacity of micro pores each having a pore diameter two or more times larger than the average pore diameter is set to 30% or less of the capacity of the entire micro pores.

20 Claims, 12 Drawing Sheets

U.S. PATENT DOCUMENTS

| | | |
|---|---|---|
| 6,447,564 B1 | 9/2002 | Ohno et al. |
| 6,541,407 B2 | 4/2003 | Beall et al. |
| 6,565,630 B2 | 5/2003 | Ohno et al. |
| 6,669,751 B1 | 12/2003 | Ohno et al. |
| 6,770,116 B2 | 8/2004 | Kojima |
| 7,611,764 B2 | 11/2009 | Komori et al. |
| 7,857,885 B2 | 12/2010 | Hong et al. |
| 8,012,234 B2 | 9/2011 | Komori et al. |
| 2003/0024219 A1 | 2/2003 | Harada et al. |
| 2003/0041730 A1 | 3/2003 | Beall et al. |
| 2003/0167755 A1 | 9/2003 | Nakatani et al. |
| 2004/0031264 A1 | 2/2004 | Kojima |
| 2004/0033175 A1 | 2/2004 | Ohno et al. |
| 2004/0055265 A1 | 3/2004 | Ohno et al. |
| 2004/0097370 A1 | 5/2004 | Ichikawa et al. |
| 2004/0161596 A1 | 8/2004 | Taoka et al. |
| 2004/0223892 A1 | 11/2004 | Kojima |
| 2005/0011174 A1 | 1/2005 | Hong et al. |
| 2005/0016140 A1 | 1/2005 | Komori et al. |
| 2005/0016141 A1 | 1/2005 | Hong et al. |
| 2005/0159310 A1 | 7/2005 | Ohno et al. |
| 2005/0176581 A1 | 8/2005 | Ohno et al. |
| 2005/0214504 A1 | 9/2005 | Yoshida |
| 2005/0229565 A1 | 10/2005 | Yoshida |
| 2005/0247038 A1 | 11/2005 | Takahashi |
| 2005/0272602 A1 | 12/2005 | Ninomiya |
| 2006/0019061 A1 | 1/2006 | Oshimi |
| 2006/0029897 A1 | 2/2006 | Saijo et al. |
| 2006/0029898 A1 | 2/2006 | Saijo et al. |
| 2006/0032203 A1 | 2/2006 | Komori et al. |
| 2006/0043652 A1 | 3/2006 | Saijo et al. |
| 2006/0059877 A1 | 3/2006 | Yoshida |
| 2007/0227109 A1 | 10/2007 | Hong et al. |
| 2008/0085394 A1 | 4/2008 | Ohno et al. |
| 2008/0086993 A1 | 4/2008 | Komori et al. |
| 2008/0261806 A1 | 10/2008 | Konstandopoulos et al. |

FOREIGN PATENT DOCUMENTS

| | | |
|---|---|---|
| EP | 1 184 066 | 3/2002 |
| EP | 1 342 494 A1 | 9/2003 |
| EP | 1 495 791 A1 | 1/2005 |
| EP | 1 541 817 A1 | 6/2005 |
| EP | 1 647 790 | 4/2006 |
| FR | 2 789 327 | 8/2000 |
| FR | 2 840 545 | 12/2003 |
| JP | 56-124418 | 9/1981 |
| JP | 58-92409 | 6/1983 |
| JP | 58-150015 | 9/1983 |
| JP | 3-010365 | 2/1991 |
| JP | 3-49608 | 7/1991 |
| JP | 3-102016 | 10/1991 |
| JP | 5-23512 | 2/1993 |
| JP | 5-68828 | 3/1993 |
| JP | 5-139861 | 6/1993 |
| JP | 6-47620 | 6/1994 |
| JP | 7-163823 | 6/1995 |
| JP | 2001-96113 | 4/2001 |
| JP | 2001-96117 | 4/2001 |
| JP | 2001-199777 | 7/2001 |
| JP | 2004-199777 | 7/2001 |
| JP | 2001-269585 | 10/2001 |
| JP | 2002-242655 | 8/2002 |
| JP | 2003-1029 | 1/2003 |
| WO | 01/23069 | 4/2001 |
| WO | WO 01/91882 A1 | 12/2001 |
| WO | 02/10562 | 2/2002 |
| WO | 02/100514 | 12/2002 |
| WO | 03/080218 | 10/2003 |
| WO | WO 2004/002608 A1 | 1/2004 |

OTHER PUBLICATIONS

Jun Kitagawa, et al., "Improvement of Pore Size Distribution of Wall Flow Type Diesel particulate Filter", Internatinal Congress & Exposition, SAE 920144, Feb. 24-28, 1992, pp. 1-8.

Atsushi Itoh, et al., "Study of SiC Applicatin to Diesel Particulate Filter (Part 1): Material Development", International Congress and Exposition, SAE 930360, Mar. 1-5, 1983, pp. 1-11.

Martin J. Murtagh, et al., "Development of a Diesel Particulate Filter Composition and Its Effect on Thermal Durability and Filteration Performance", International Congress & Exposition, SAE 940235, Feb. 28-Mar. 3, 1994, pp. 1-13.

Kazutake Ogyu, et al., "Characterization of Thin Wall SiC-DPF", SAE International, SAE 2003-01-0377, 2003 pp. 1-9.

G.A. Merkel, et al., "Effects of Microstructure and cell Geometry on Performance of Cordierite Diesel Particular Filters", SAE 2001 World Congress, SAE 2001-01-0193, Mar. 5-8. 2001, pp. 1-15.

Noriyuki Taoka, et al., "Effect of Sic-DPF with High Cell Density for Pressure Loss and Regeneration", SAE 2001 World Congress, SAE 200-01-0191, Mar. 5-8, 2001, pp. 1-9.

Jis Z 8815-1994, Japanese Industrial Standard, Test sieving General requirements, Revised Dec. 1, 1994.

AutoPore IV 9500, Operator's Manual, Shimadzu Corporation, Part No. 950-42801-01.

Improving of the filtration and regeneration performance by the SiC-DPF with the layer coating of PM oxidation catalyst, SAE International, 2008-01-06212, Kazutake, Ogyu, et al., Ibiden, Co., Ltd.

U.S. Appl. No. 10/515,181, filed Jul. 1, 2005, Komori, et al.

\* cited by examiner

A-A Line cross-sectional view (a)

(b) B-B Line cross-sectional view (a)

(b)

(c)

(d)

B-B Line cross-sectional view (a)

(b)

US 8,361,400 B2

HONEYCOMB STRUCTURAL BODY

CROSS-REFERENCE TO RELATED APPLICATIONS

This application is a continuation of and claims the benefit of priority to U.S. application Ser. No. 10/516,328, filed on Aug. 17, 2005, which is a national stage of International Application No. PCT/JP04/08816 filed on Jun. 23, 2004, which claims benefit of priority to Japanese Patent Application No. 2003-178713, filed on Jun. 23, 2003. The contents of those applications are incorporated by reference herein.

TECHNICAL FIELD

The present invention relates to a honeycomb structural body used for the purpose of collecting particulates in exhaust gases discharged from an internal combustion engine such as a diesel engine or the like.

BACKGROUND ART

Recently, particulates contained in exhaust gases discharged from internal combustion engines of vehicles, such as buses, trucks and the like, and construction machines and the like have raised serious problems as those particulates are harmful to the environment and the human body.

Conventionally, there have been proposed various ceramic filters which allow exhaust gases to pass through porous ceramics to collect particulates in the exhaust gases, thereby purifying the exhaust gases.

As such a ceramic filter, as shown in FIG. 7, there has been known a honeycomb filter 120, which is prepared as a honeycomb structural body made of silicon carbide and the like, and has a structure in which a plurality of square-pillar shaped porous ceramic members 130 are combined with one another through a sealing material layer 124 that serves as an adhesive to form a ceramic block 125, and a sealing material layer 123 is also formed on the circumference of this ceramic block 125 so as to prevent leakage of exhaust gases.

The honeycomb filter 120 uses the porous ceramic members 130 having a structure as shown in FIG. 8 as constituent components, and a partition wall 133, which are formed therein to separate through holes 131 a large number of which are placed in parallel with one another in the length direction, functions as filters.

In other words, as shown in FIG. 8(b), each of the through holes 131, formed in the porous ceramic member 130, is sealed with a sealing member 132 at one of ends of its exhaust gas inlet side or outlet side, so that exhaust gases that have entered one through hole 131 are discharged from another through hole 131 after having always passed through a partition wall 133 that separates the through holes 131.

Here, as described above, the sealing material layer 123, formed on the periphery, is provided for the purpose of preventing exhaust gases from leaking from the peripheral portion of the ceramic block 125, when the honeycomb filter 120 is installed in an exhaust passage of an internal combustion engine.

Since the honeycomb filter 120 of such a structure has superior heat resistance and provides easy regenerating processes and the like, it has been applied to various large-size vehicles and vehicles with diesel engines. In other words, when the honeycomb filter 120 having such a structure is installed in the exhaust passage of an internal combustion engine, particulates in exhaust gases discharged from the internal combustion engine are captured by the partition wall 133 upon passing through the honeycomb filter 120, so that the exhaust gases are purified.

Moreover, with respect to such a type of honeycomb filter, disclosed is a structure in which the opening area on the exhaust gas inlet side is made larger than the opening area on the exhaust gas outlet side, so that the area of the wall portion through which exhaust gases pass per unit volume is made larger so as to improve the effective volume serving as the filter (for example, see Patent Literatures 1 to 12).

FIG. 9 schematically shows a cross-section perpendicular to the length direction of an exhaust gas filter disclosed in Patent Literature 1 (see FIG. 3 of Patent Literature 1).

In this exhaust gas filter 310, the respective through holes have the same size, and the number of through holes 312, which are sealed at the exhaust gas inlet side, is made smaller than the number of through holes 311, which are sealed at the exhaust gas outlet side. With this arrangement, the opening area on the exhaust gas inlet side is made larger than the opening area on the exhaust gas outlet side, so that the effective volume serving as the filter is improved.

FIG. 10 schematically shows a cross-section perpendicular to the length direction of an exhaust gas filter disclosed in Patent Literature 2 (see Patent Literature 2).

In this exhaust gas filter 320, the opening area and the number of through holes 322, which are sealed at the exhaust gas inlet side, are made different from the opening area and the number of through holes 321, which are sealed at the exhaust gas outlet side. Thus, the opening area on the exhaust gas inlet side is made larger than the opening area on the exhaust gas outlet side, so that the effective volume serving as the filter is improved.

FIG. 11 schematically shows a cross-section perpendicular to the length direction of an exhaust gas filter disclosed in Patent Literature 1 (see FIG. 17 of Patent Literature 1).

In this exhaust gas filter 330, the opening area of through holes 332, which are sealed at the exhaust gas inlet side, is made different from the opening area of through holes 331, which are sealed at the exhaust gas outlet side.

Moreover, in this filter, the number of the through holes 332 and the number of the through holes 331 are the same, and the through holes 331, which are sealed at the exhaust gas outlet side, are mutually made in face-contact with each other through a partition wall. Also in the case of the exhaust gas filter having this structure, the opening area on the exhaust gas inlet side is made larger than the opening area on the exhaust gas outlet side, so that the effective volume serving as the filter is improved.

FIG. 12 schematically shows a cross-section perpendicular to the length direction of an exhaust gas filter disclosed in Patent Literature 3 (see FIG. 5p of Patent Literature 3).

In this exhaust gas filter 340, the opening area of through holes 342, which are sealed at the exhaust gas inlet side, is made different from the opening area of through holes 341, which are sealed at the exhaust gas outlet side.

Moreover, in this filter, the number of the through holes 342 and the number of the through holes 341 are the same, and the through holes 341, which are sealed at the exhaust gas outlet side, are constituted not to have face-contact with each other through a partition wall. Also in the case of the exhaust gas filter having this structure, the opening area on the exhaust gas inlet side is made larger than the opening area on the exhaust gas outlet side, so that the effective volume serving as the filter is improved.

In these conventional filters, the opening area on the gas inlet side is made larger than the opening area on the gas outlet side, so that the effective filtering area of the partition wall is made greater; thus, it becomes possible to collect a large amount of particulates. Moreover, in these filters, an object thereof is to reduce a pressure loss upon collecting the same amount of particulates in comparison with a filter in which, as shown in FIGS. 7 and 8, the cross-sectional shape of all the through holes is a quadrangular shape and the opening area on the gas-inlet side and the opening area on the exhaust gas outlet side are the same.

However, these conventional filters tend to fail to sufficiently achieve the latter object, that is, a reduction in a pressure loss upon collecting the same amount of particulates.

In the above-mentioned filters, it is considered that the following four factors mainly give effects to the pressure loss.

More specifically, those factors are considered to include: (1) an aperture ratio on the exhaust gas inlet side ($\Delta Pa$), (2) friction upon passage through through holes (gas inlet side through hole: $\Delta Pb$-1, gas outlet side through hole: $\Delta Pb$-2), (3) resistance upon passage through a partition wall ($\Delta PC$), and (4) resistance exerted upon passage through collected particulates ($\Delta Pd$). Here, among these, the effect exerted by (4) resistance exerted upon passage through collected particulates ($\Delta Pd$) is considered to be greatest.

Here, in the case of the filters having the structures shown in FIGS. 9 to 12, the initial pressure loss (pressure loss in a state without particulates collected) tends to become higher in comparison with the filter in which, as shown in FIGS. 7 and 8, the cross-sectional shape of all the through holes is a quadrangular shape and the opening area on the exhaust gas inlet side and the opening area on the exhaust gas outlet side are the same. The reason for this is because, although the pressure loss caused by $\Delta Pa$ and $\Delta Pb$-1 is slightly reduced, the pressure loss caused by $\Delta Pb$-2 and $\Delta Pc$ becomes higher.

Moreover, with respect to the pressure loss after collection of particulates in a filter having each of structures as shown in FIGS. 9 to 12, the filters having the structures shown in FIGS. 9 to 11 have a partition wall commonly possessed by the gas flow-in through holes. In the filters having this structure, as shown in FIG. 13, exhaust gases first flow from the gas flow-in through hole 1311 side to the gas flow-out through hole 1312 side through flow passages "a" via the partition wall commonly possessed by the gas flow-in through hole 1311 and the gas flow-out through hole 1312. At this time, particulates are captured by the partition wall commonly possessed by the gas flow-in through hole 1311 and the gas flow-out through hole 1312 (see FIG. 13(*a*)).

Thereafter, as the particulates 1313 are collected on the partition wall commonly possessed by the gas flow-in through hole 1311 and the gas flow-out through hole 1312, so that the pressure loss in the partition wall becomes higher due to $\Delta Pd$, and exhaust gases are allowed to flow from the gas flow-in through hole 1311 side to the gas flow-out through hole 1312 side through flow passages "b" via a partition wall commonly possessed by the gas flow-in through holes 1311 (see FIG. 13(*b*)).

In this case, of the partition wall commonly possessed by the gas flow-in through holes 1311, it is considered that: the exhaust gases start to flow at the portion closest to the partition wall commonly possessed by the gas flow-in through hole 1311 and the gas flow-out through hole 1312; and the gas flow-in portion gradually expands to finally allow the entire partition wall forming the gas flow-in through hole 1311 to serve as an effective filtering region.

FIGS. 13(*a*) and 13(*b*) are schematic diagrams for describing flow passages of exhaust gases in the conventional filters.

In a honeycomb structural body of this type, when the amount of particulates accumulated on the partition wall commonly possessed by the gas flow-in through hole 1311 and the gas flow-out through hole 1312 is large, it has been difficult to reduce the pressure loss upon collection of particulates.

Moreover, Patent Literatures 3 and 4 disclose a filter in which an average porosity is more than 10% or less and pores have an average pore diameter of 2 to 15 μm, with individual pore diameters distributed in the almost entire range from 0.5 to 70 μm.

The present inventors have also studied methods for increasing the pore diameter in order to reduce the pressure loss. However, as a result of the studies, it has been found that unexpectedly, even when the pore diameter is made larger, the pressure loss is not lowered.

Patent Literature 1: JP-B 03-49608 (1991) (FIGS. 3, 17 and the like), U.S. Pat. No. 4,417,908, JP-A 58-196820 (1983)
Patent Literature 2: JP-U 58-92409 (1983)
Patent Literature 3: U.S. Pat. No. 4,364,761 (FIG. 5p and the like), JP-A 56-124417 (1981), JP-A 62-96717 (1987)
Patent Literature 4: U.S. Pat. No. 4,276,071
Patent Literature 5: U.S. Pat. No. 4,420,316
Patent Literature 6: U.S. Pat. No. 4,420,316
Patent Literature 7: JP-A 58-150015 (1983)
Patent Literature 8: JP-A05-68828 (1993), Japanese Patent No. 3130587
Patent Literature 9: FR2789327
Patent Literature 10: WO02/100514
Patent Literature 11: WO02/10562, DE10037403
Patent Literature 12: WO03/20407, US Patent 2003-41730, U.S. Pat. No. 6,696,132

DISCLOSURE OF THE INVENTION

Problems to be Solved by the Invention

The present inventors have examined a structure which can not be seen in the conventional technique, in which the rate of micro pores having relatively larger pore diameters in comparison with an average pore diameter is reduced with respect to the pore distribution as a whole. Thus, they have found that: by adopting the above-mentioned structure in a honeycomb structural body in which the sealing is made so as to make difference in the aperture ratio, it becomes possible to allow exhaust gases to flow inmost efficiently, to reduce the pressure loss, and also to prolong the period up to a regenerating process. Thus, the present invention has been achieved.

Means for Solving the Problems

The present invention is directed to a columnar honeycomb structural body comprising a large number of through holes placed in parallel with one another in a length direction with a wall portion interposed therebetween, wherein:
each of the through holes has one of ends sealed;
one end face of the through hole differs in opening area from the other end face thereof;
a ceramic material which constitutes the wall portion has an average pore diameter in a range from 5 to 30 μm; and
the rate of capacity of micro pores each having a pore diameter two or more times larger than the average pore diameter is set to 30% or less of the capacity of the entire micro pores.

Hereinafter, description will be given of the honeycomb structural body of the present invention.

In the honeycomb structural body of the present invention, the ceramic material which constitutes the wall portion has an average pore diameter in a range from 5 to 30 μm, and the rate of capacity of micro pores, each having a pore diameter two or more times larger than the average pore diameter, is set to 30% or less of the capacity of the entire micro pores; therefore, as shown in FIG. 14, particulates are prevented from penetrating into deep portions in the wall portion 82, so that the apparent thickness "d" (thickness 81 of a particulate layer determined by taking into consideration the particulates deposited inside the partition wall as well) of the particulates becomes thinner.

Moreover, since particulates are prevented from penetrating into deep portions in the wall portion, the particulates are accumulated on only the surface layer portion of a portion that easily transmits gases because of its structure (for example, a portion of a partition wall that separates a through hole having an opening on its gas inlet side and a through hole having an opening on its gas outlet side and the like) in a short period of time. With this arrangement, therefore, from an early stage with little amount of collection of particulates, not only the portion that easily transmits gases because of its structure, but also a portion that hardly transmits gases because of its structure (for example, a portion of a partition wall that separates through holes having openings on the gas inlet sides and the like), is allowed to transmit gases, thereby making it possible to increase the effective filtering area.

Moreover, since the particulates are hardly allowed to penetrate into the inner portions of the wall portion, the resistance exerted upon passing through the wall portion hardly increases. As a result, the degree of an increase in the pressure loss after collection of particulates is made smaller, making it possible to prolong a period up to the regenerating process.

In the honeycomb structural body of the present invention, when the opening area on the gas inlet side is made larger than the opening area on the gas outlet side, the filtering area serving as the filter becomes larger, making it possible to improve the collecting performance for particulates.

Effects of the Invention

The honeycomb structural body of the present invention makes it possible to prevent particulates from penetrating into deeper portions in the wall portion and, consequently, to make the apparent thickness of the particulates thinner as well as allowing particulates to accumulate only on the surface portion of a portion that easily transmits gases because of its structure; thus, with this arrangement, even from an early stage with little amount of collection of particulates, not only the portion that easily transmits gases because of its structure, but also a portion that hardly transmits gases because of its structure, is allowed to transmit gases, thereby making it possible to increase the effective filtering area.

Moreover, since the particulates are hardly allowed to penetrate into the inner portions of the wall portion, the resistance exerted upon passing through the wall portion hardly increases. As a result, the degree of an increase in the pressure loss after collection of particulates is made smaller, making it possible to prolong a period up to the regenerating process.

In the honeycomb structural body of the present invention, when the opening area on the gas inlet side is made larger than the opening area on the gas outlet side, the filtering area serving as the filter becomes larger, making it possible to improve the collecting performance for particulates.

EMBODIMENTS OF THE INVENTION

The present invention is related to a columnar honeycomb structural body comprising a large number of through holes placed in parallel with one another in a length direction with a wall portion interposed therebetween, wherein:

each of the through holes has one of ends sealed;
one end face of the through hole differs in opening area from the other end face thereof;
a ceramic material which constitutes the wall portion has an average pore diameter in a range from 5 to 30 μm; and
the rate of capacity of micro pores each having a pore diameter two or more times larger than the average pore diameter is set to 30% or less of the capacity of the entire micro pores.

The honeycomb structural body of the present invention has a columnar structure in which a large number of through holes are placed in parallel with one another in the length direction with a wall portion interposed therebetween. The honeycomb structural body may be formed by combining a plurality of columnar porous ceramic members, each having a plurality of through holes that are placed in parallel with one another in the length direction with a partition wall interposed therebetween, with one another through sealing material layers (hereinafter, also referred to as an aggregated honeycomb structural body), or may be formed by ceramic members that are integrally sintered as one unit as a whole (hereinafter, also referred to as an integrated honeycomb structural body). Here, the honeycomb structural body may have a coat layer formed on the circumference thereon.

In the case of the aggregated honeycomb structural body, the wall portion is constituted by a partition wall that separates through holes of porous ceramic members from each other and a sealing material layer that serves as an adhesive layer between the porous ceramic members. In the case of the integrated honeycomb structural body, the wall portion is formed by a partition wall of one kind. In the following description, both of the partition wall and the sealing material layer are referred to as a wall portion without discrimination, unless the discrimination is required.

FIG. 1 is a perspective view that schematically shows a specific example of an aggregated honeycomb structural body as one example of the honeycomb structural body of the present invention, FIG. 2(a) is a perspective view that schematically shows one example of a porous ceramic member that forms the honeycomb structural body shown in FIG. 1, and FIG. 2(b) is a cross-sectional view taken along line A-A of the porous ceramic member shown in FIG. 2(a).

As shown in FIG. 1, the honeycomb structural body 10 of the present invention has a structure in which a plurality of porous ceramic members 20 are combined with one another through a sealing material layer 14 to form a ceramic block 15, with a sealing material layer 13 for preventing exhaust gas leak being formed on the periphery of this ceramic block 15.

Here, in the porous ceramic member 20, a large number of through holes 21 are placed in parallel with one another in the length direction, and each of the through holes 21 has its one of ends sealed with a plug 22. Here, a through hole 21a with a relatively larger area in its cross-sectional area perpendicular to the length direction has its end on the exhaust gas outlet side sealed, and a through hole 21b with a relatively smaller area in the cross-sectional area has its end on the exhaust gas inlet side sealed.

Therefore, the honeycomb structural body 10 has a structure in which the opening area on the exhaust gas inlet side is made larger than the opening area on the exhaust gas outlet side.

Here, in the ceramic member 20, a portion of the wall portion (partition wall) 23 that separates the through hole 21a having an opening on its exhaust gas inlet side (hereinafter, also referred to as a gas flow-in through hole) and the through hole 21b having an opening on its exhaust gas outlet side (hereinafter, also referred to as a gas flow-out through hole)

functions as a filter. In other words, exhaust gases that have entered one of the gas flow-in through holes 21a are allowed to flow out of other gas flow-out through holes 21b after always passing through these portions of the wall portion (partition wall) 23 that separates the corresponding through holes from each other.

In the honeycomb structural body 10 shown in FIG. 1, the shape is prepared as a column shape; however, not particularly limited to the column shape, the honeycomb structural body of the present invention may have any desired shape, such as an elliptical column shape and a rectangular pillar shape, and any size.

In the honeycomb structural body of the present invention, the material for the porous ceramic material is not particularly limited, and examples thereof include: nitride ceramics such as aluminum nitride, silicon nitride, boron nitride, titanium nitride and the like; carbide ceramics such as silicon carbide, zirconium carbide, titanium carbide, tantalum carbide, tungsten carbide and the like; and oxide ceramics such as alumina, zirconia, cordierite, mullite and the like. Moreover, the honeycomb structural body of the present invention may be made of a composite material of silicon and silicon carbide or the like, or may be made of aluminum titanate. Among these, silicon carbide, which has high heat resistance, superior mechanical properties and high thermal conductivity, is desirably used.

Moreover, the porous ceramic member has an average pore diameter in a range from 5 to 30 μm, and the rate of capacity of micro pores each having a pore diameter two or more times larger than the average pore diameter is set to 30% or less of the capacity of the entire micro pores.

Since the average pore diameter is set in a range from 5 to 30 μm, particulates are prevented from penetrating into deep portions in the wall portion, making the structural body less susceptible to clogging due to particulates.

The average pore diameter of less than 5 μm tends to cause clogging due to particulates, resulting in an increase in the pressure loss. In contrast, the average pore diameter exceeding 30 μm causes particulates to penetrate into deep portions in the wall portion, failing to provide the effects of the present invention.

Moreover, since, in the porous ceramic member, the rate of capacity of micro pores each having a pore diameter two or more times larger than the average pore diameter is set to 30% or less of the capacity of the entire micro pores, it is possible to make the pore diameter comparatively uniform and, consequently, to maintain resistance caused upon passage of exhaust gases through the wall portion in a small level.

In other words, with respect to the pore distribution state of the wall mutually separating the through holes on the gas-inlet side and the gas outlet side, by making micro pores having relatively larger pore diameters smaller in the number so that the gases are intentionally made difficult to flow, the gases are allowed to flow through the partition wall separating the through holes on the gas inlet side from each other in an early stage so that it becomes possible to reduce the pressure loss.

This mechanism that makes the pressure loss lower has not been sufficiently clarified; however, the mechanism is presumably described as follows:

When the rate of capacity of micro pores each having a pore diameter two or more times larger than the average pore diameter exceeds 30%, the rate of pore diameters that are comparatively larger than the average pore diameter becomes higher. Then, at the initial stage, that is, at the stage immediately after collection of particulates, as shown in FIG. 15, exhaust gases are allowed to enter the portions of the micro pores having greater pore diameters more easily. Consequently, particulates are allowed to penetrate into deep portions in the partition wall 84 (deep portions in micro pores).

Moreover, since the exhaust gases are allowed to flow easily, it is possible to accumulate the particulates in deeper layer portions in high density. For this reason, although the apparent thickness "D" of the particulate layer 83 (thickness of the particulate layer in a state with the inside of the micro pore being filled with particulates) becomes thicker to make the initial pressure loss lower, the pressure loss sometimes has an abrupt increase due to resistance (ΔPd) upon passage of particulates as the particulates accumulate.

As described above, when the rate of capacity of micro pores each having a pore diameter two or more times larger than the average pore diameter exceeds 30%, with respect to the capacity of the entire micro pores, the pressure loss of the filter increases consequently. Here, arrows indicate flows of exhaust gases.

Moreover, as described above, after particulates have been sufficiently accumulated in the partition wall separating the gas inlet side through hole and the gas outlet side through hole, particulates are also allowed to flow through the partition wall separating the gas flow-in through holes from each other.

In contrast, in the honeycomb structural body of the present invention, with respect to the pore distribution state of the wall portion separating the through holes on the gas inlet side and the gas outlet side, by making micro pores having relatively larger pore diameters smaller in the number so that the gases are intentionally made difficult to flow in comparison with the case in which micro pores having a large pore diameter are formed. As a result, exhaust gases are allowed to flow through the partition wall separating the gas flow-in through holes from each other, in a relatively early stage; thus, it becomes possible to avoid an abrupt rise in the pressure loss due to the thickness of particulates, uneven collecting processes and the like.

Moreover, as described with reference to FIG. 14, in the filter of this type, since the thickness of particulates to be accumulated on the partition wall is made thinner, it becomes possible to prevent an insufficient regenerating process due to difficulty in burning particulates and damages in a filter due to thermal impact caused by an abrupt burning process.

Here, the pore diameter can be measured through known methods, such as a mercury injection method, and a measuring method using a scanning electronic microscope (SEM).

When it is taken into consideration that the present invention needs to measure the entire pore diameter distribution, the pore diameter is desirably measured through the mercury injection method.

In the same manner as the honeycomb structural body 10 shown in FIG. 1, the opening area on the exhaust gas inlet side is desirably made larger than the opening area on the exhaust gas outlet side. This structure makes it possible to expand the filtering area as the filter, and consequently to improve the particulate collecting performance.

Further, in the above-mentioned honeycomb structural body, it is preferable to provide the partition wall that separates through holes on the gas inlet side from each other.

This structure makes it possible to ensure a wider effective filtering area while maintaining a low pressure loss.

In the honeycomb structural body of the present invention, the porosity of the porous ceramic member is desirably set in a range from 30 to 70%.

This structure makes it possible to maintain sufficient strength in the porous ceramic member, to make particulates difficult to enter the partition wall and, consequently, to maintain resistance caused upon passage of exhaust gases through the partition wall in a low level.

The porosity of less than 30% tends to cause clogging in the partition wall in an early stage, while the porosity exceeding 70% tends to cause degradation in the porous ceramic member; thus, it might be easily broken.

Here, the above-mentioned porosity can be measured through known methods such as a mercury injection method, Archimedes method and a measuring method using a scanning electronic microscope (SEM).

In the honeycomb structural body of the present invention, the thickness of the wall portion is desirably set in a range from 0.1 to 0.5 mm. This structure makes it possible to maintain sufficient strength in the porous ceramic member and, consequently, to maintain resistance caused upon passage of exhaust gases through the partition wall in a low level.

The thickness of less than 0.1 mm tends to cause insufficient strength in the honeycomb structural body, while the thickness exceeding 0.5 mm tends to cause a great increase in the pressure loss.

Moreover, in the honeycomb structural body of the present invention, the opening (through holes) on a cross-section perpendicular to the length direction desirably has a density in a range from 15.5 to 62.0 pcs/cm$^2$.

In the case where the density is less than 15.5 pcs/cm$^2$, since the total area of the wall portion becomes smaller to cause a reduction in the filtering efficiency as well as a reduction in the strength of the honeycomb structural body depending on the thickness of the wall portion. In the case where the density exceeds 62.0 pcs/cm$^2$, the respective opening areas (through holes) on the gas inlet side and the gas outlet side become small, causing a reduction in the filter efficiency; in particular, when the opening (through hole) area on the gas-inlet side is smaller, the pressure loss tends to become greater.

With respect to the particle size of ceramic particles to be used upon manufacturing the porous ceramic members, although not particularly limited, those which are less susceptible to shrinkage in the succeeding firing process are desirably used, and for example, those particles, prepared by combining 100 parts by weight of particles having an average particle size from 0.3 to 50 μm with 5 to 65 parts by weight of particles having an average particle size from 0.1 to 1.0 μm, are desirably used. By mixing ceramic powders having the above-mentioned respective particle sizes at the above-mentioned blending ratio, it is possible to provide a porous ceramic member.

Moreover, by adjusting the particle sizes of the above-mentioned two kinds of powders, in particular, the particle size of the powder having the greater particle size, the pore diameter of the porous ceramic member can be adjusted in the above-mentioned range. In the case where an integrated honeycomb structural body is manufactured, the same method can be used.

Furthermore, a pore forming material having a uniform particle size may be mixed in the material, and the resulting mixture is fired, so that a porous ceramic member having an adjusted pore diameter may be manufactured. Here, the pore-forming material refers to a material used for forming pores in a processed ceramic material and, for example, those materials which are eliminated through a firing process may be listed.

The above-mentioned plug is desirably made of porous ceramics.

In the honeycomb structural body of the present invention, since the porous ceramic member with one end sealed with the plug is made of porous ceramics, by making the plug using the same porous ceramics as the porous ceramic member, it becomes possible to increase the bonding strength between the two materials, and by adjusting the porosity of the plug similarly to that of the above-mentioned porous ceramic member, it is possible to take the matching of the coefficient of thermal expansion of the porous ceramic member and the coefficient of thermal expansion of the plug; thus, it becomes possible to prevent the occurrence of a gap between the plug and the partition wall due to a thermal stress that is exerted upon production as well as upon use and the occurrence of a crack in the plug or the portion of the partition wall with which the plug comes in contact.

In the case where the plug is made of porous ceramics, with respect to the material thereof, not particularly limited, the same material as the ceramic material which constitutes the porous ceramic member may be used.

In the honeycomb structural body of the present invention, the sealing material layers (a wall portion) 13, 14 are formed between the porous ceramic members 20 as well as on the periphery of the ceramic block 15. Further, the sealing material layer (a wall portion) 14, formed between the porous ceramic members 20, also serves as an adhesive that bonds a plurality of porous ceramic members 20 to one another, and the sealing material layer (a wall portion) 13, formed on the periphery of the ceramic block 15, serves as a sealing material used for preventing leak of exhaust gases from the peripheral portion of the ceramic block 15, when the honeycomb structural body 10 of the present invention is installed in an exhaust passage of an internal combustion engine.

With respect to the material which constitutes the sealing material layer, not particularly limited, for example, a material composed of an inorganic binder, an organic binder and inorganic fibers and/or inorganic particles, or the like, may be used.

Here, as described above, in the honeycomb structural body of the present invention, the sealing material layer is formed between the porous ceramic members as well as on the periphery of the ceramic block; and these sealing material layers may be made of the same material or materials different from each other. Moreover, in the case where the sealing material layers are made of the same material, the blending ratios of the materials may be the same or different from each other.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof include ceramic fibers such as silica-alumina, mullite, alumina, silica and the like. Each of these may be used alone or two or more kinds of these may be used in combination. Among the inorganic fibers, silica-alumina fibers are more desirably used.

With respect to the inorganic particles, examples thereof include carbides, nitrides and the like, and specific examples include inorganic powder or whiskers made of silicon carbide, silicon nitride, boron nitride and the like. Each of these may be used alone, or two or more kinds of these may be used in combination. Among the inorganic fine particles, silicon carbide having superior thermal conductivity is desirably used.

The sealing material layer may be made of a dense material or may be made of a porous material.

FIG. 3(a) is a perspective view that schematically shows a specific example of an integrated honeycomb structural body as one example of the honeycomb structural body of the present invention, and FIG. 3(b) is a cross-sectional view taken along line B-B of FIG. 3(a).

As shown in FIG. 3(a), the honeycomb structural body 30 is made of a columnar porous ceramic block 35 in which a large number of through holes 31 are placed in parallel with one another in the length direction with a partition wall 33 interposed therebetween. Each of the through holes 31 has its one of the ends sealed with a plug 32. Here, the through hole 31a, which has a relatively larger cross-sectional area perpendicular to the length direction, has its end on the exhaust gas outlet side sealed so as to serve as the gas flow-in through hole, and the through hole 31b, which has a relatively smaller cross-sectional area, has its end on the exhaust gas inlet side sealed so as to serve as the gas flow-out through hole.

Although not shown in FIG. 3, a sealing material layer may be formed on the circumference of the porous ceramic block 35 in the same manner as the honeycomb structural body 10 shown in FIG. 1.

Except that the porous ceramic block 35 has an integrated structure formed through a sintering process, the honeycomb structural body 30 has the same structure as the aggregated honeycomb structural body 10. Therefore, also in the honeycomb structural body 30, the partition wall 33 that separates the gas flow-in through hole 31a and the gas flow-out through hole 31b is allowed to function as a filter, so that exhaust gases that have entered the gas flow-in through holes 31a are allowed to flow out of the gas flow-in through holes 31b after always passing through the partition wall 33.

Therefore, the integrated honeycomb structural body 30 also has the same effects as those of the aggregated honeycomb structural body.

In the same manner as the aggregated honeycomb structural body 10, in the integrated honeycomb structural body 30, the porous ceramic block 35 has an average pore diameter in a range from 5 to 30 μm and the rate of capacity of micro pores each having a pore diameter two or more times larger than the average pore diameter is set to 30% or less of the capacity of the entire micro pores. Further, the shape and size of the integrated honeycomb structural body 30 may also be determined desirably, and the porosity thereof is desirably set in a range from 30 to 70% in the same manner as the aggregated honeycomb structural body.

Moreover, the density of openings (through holes) on the cross-section perpendicular to the length direction and the thickness of the wall portion are desirably set in the same manner as the aggregated honeycomb structural body.

With respect to the porous ceramics which constitute the porous ceramic block 35, not particularly limited, the same nitride, carbide and oxide ceramics used in the aggregated honeycomb structural body may be proposed, and in general, oxide ceramics such as cordierite and the like are desirably used.

The plug 32 to be used in the integrated honeycomb structural body 30 is also desirably made of porous ceramics, and with respect to the material thereof, although not particularly limited, for example, the same materials as the ceramic materials used for forming the above-mentioned porous ceramic block 35 may be used.

In the above-mentioned honeycomb structural body having the structure as shown in FIGS. 1 and 3, although not particularly limited, the shape of a cross-section perpendicular to the length direction of each of those through holes is desirably formed into a polygonal shape.

This polygonal shape eliminates portions of the through hole that cause greater friction when exhaust gases are allowed to pass through the through hole due to the shape of the through hole and, consequently, reduces a pressure loss caused by the friction of exhaust gases upon passing through the through hole, and also eliminates portions of a partition wall with irregular thicknesses, that is, portions that locally make it difficult for exhaust gases to pass through, so as to reduce a pressure loss caused by resistance of a partition wall exerted when exhaust gases pass through the partition wall; thus, the polygonal shape is allowed to exert either of the above-mentioned effects.

Moreover, among polygonal shapes, a polygonal shape of a quadrangle or more is desirably used, and at least one of the corners is desirably formed as an obtuse angle. With this arrangement, it becomes possible to reduce a pressure loss caused by friction of exhaust gases upon flowing through the through hole inlet side and friction of exhaust gases upon flowing through the through hole outlet side.

The vicinity of each of corners on the cross-section of the through hole is desirably formed by a curved line. By forming the corner into a curved line, it becomes possible to prevent occurrence of cracks caused by a stress concentration at the corner.

Here, the opening area on the exhaust gas inlet side is desirably made larger than the opening area on the exhaust gas outlet side; and in this case, the ratio of the opening area on the exhaust gas inlet side and the opening area on the exhaust gas outlet side (the opening area on the exhaust gas inlet side/the opening area on the exhaust gas outlet side, hereinafter, also referred to simply as opening area ratio) is desirably set in a range from 1.01 to 6.

When the ratio of areas exceeds 6, the capacity of the through holes on the exhaust gas outlet side becomes too small; thus, the pressure loss, caused by friction upon passing through the through holes and resistance upon passing through the partition wall, increases to cause an increase in the initial pressure loss, resulting in an increase in the initial pressure loss. The ratio of the areas is desirably set in a range from 1.2 to 5. More desirably, the ratio of the areas is set in a range from 1.2 to 3.0.

FIGS. 4(a) to 4(d) as well as FIGS. 5(a) to 5(f) are cross-sectional views each of which schematically shows one portion of the cross-section of a porous ceramic member constituting the aggregated honeycomb structural body in accordance with the present invention. Here, regardless of the integrated type and the aggregated type, the shapes of the cross-sections of the respective through holes are the same; therefore, referring to these Figures, the cross-sectional shapes in the honeycomb structural body of the present invention are described.

In FIG. 4(a), the ratio of opening areas is almost 1.55, in FIG. 4(b), it is almost 2.54, in FIG. 4(c), it is almost 4.45 and in FIG. 4(d), it is almost 6.00. Moreover, in FIGS. 5(a), 5(c) and 5(e), all the ratios of opening areas are almost 4.45, and in FIGS. 5(b), 5(d) and 5(f), all the ratios of opening areas are almost 6.00.

In FIGS. 4(a) to 4(d), each of the cross-sectional shapes of the gas flow-in through holes is an octagon, and each of the cross-sectional shapes of the gas flow-out through holes is a quadrangle (square), and these are alternately arranged; thus, by changing the cross-sectional area of each of the gas flow-out through holes, with the cross-sectional shape of each of the gas flow-in through holes being slightly changed, it is possible to desirably change the ratio of opening areas easily.

In the same manner, with respect to the honeycomb filter shown in FIG. 5, the ratio of opening areas can be desirably changed.

Here, in honeycomb structural bodies 160 and 260 shown in FIGS. 5(a) and 5(b), each of the cross-sectional shapes of the gas flow-in through holes 161a and 261a is a pentagon with three corners thereof being set to almost right angles, and each of the cross-sectional shapes of the gas flow-in through holes 161b and 261b is a quadrangle, and the respective quadrangles are placed at portions of a greater quadrangle, which diagonally face each other. Honeycomb structural bodies 170 and 270, shown in FIGS. 5(c) and 5(d), have modified shapes of the cross-sections shown in FIGS. 4(a) to 4(d) so that a portion of the partition wall commonly possessed by each of the gas flow-in through holes 171a, 271a and each of the gas flow-in through holes 171b, 271b is expanded toward the gas flow-in through hole side with a certain curvature. This curvature may be desirably set.

In this case, the curved line, which forms a portion of the partition wall commonly possessed by each of the gas flow-in through holes 171a, 271a and each of the gas flow-in through holes 171b, 271b, corresponds to ¼ of a circle.

In honeycomb structural bodies 180 and 280 shown in FIGS. 5(e) to 5(f), the gas flow-in through holes 181a, 281a and the gas flow-in through holes 281b, 281b are formed into quadrangles (rectangular shapes), and as shown in Figures, these through holes are arranged so that, when the two gas flow-in through holes and the two gas flow-in through holes are combined with one another, an almost square shape is formed.

Moreover, the cross-sectional shapes of the through holes forming the honeycomb structural body of the present invention may have the shapes that have already shown in FIGS. 9 to 12.

Therefore, in the honeycomb structural body of the present invention, the opening area of the gas flow-in through holes may be made greater than the opening area of the gas flow-out through holes, and the numbers of the gas flow-in through holes and the gas flow-out through holes may be different.

In the present invention, the distance between centers of gravity of cross-sections perpendicular to the length direction of adjacently located gas flow-in through holes is desirably designed to be equal to the distance between centers of gravity of cross-sections perpendicular to the length direction of adjacently located gas flow-out through holes.

The term "the distance between centers of gravity of the cross-sections of adjacent gas flow-in through holes" represents the smallest distance between the center of gravity on a cross-section perpendicular to the length direction of one gas flow-in through hole and the center of gravity on a cross-section perpendicular to the length direction of an adjacent gas flow-in through hole; and the term "the distance between centers of gravity of the cross-sections of adjacent gas flow-out through holes" represents the smallest distance between the center of gravity on a cross-section perpendicular to the length direction of one gas flow-out through hole and the center of gravity on a cross-section perpendicular to the length direction of an adjacent gas flow-out through hole.

In the case where the two distances between centers of gravity are equal to each other, since heat is uniformly dispersed upon regenerating, it is possible to prevent the temperature inside the honeycomb structural body from being locally distributed in a biased manner, and consequently to provide a filter having superior durability free from cracks caused by a thermal stress, even after long-term repetitive use.

When the honeycomb structural body of the present invention is used as a filter for collecting particulates in exhaust gases, collected particulates are gradually deposited on the inside of each of the through holes forming the honeycomb structural body.

Here, as the amount of deposited particulates becomes greater, the pressure loss increases gradually, and when it exceeds a predetermined value, the load imposed on the engine becomes too high. Therefore, in the present invention, the filter is regenerated by burning the particulates, and in the case of the present invention, since the degree of an increase in the pressure loss after collection of particulates is made smaller in comparison with that of the conventional filter, it becomes possible to prolong the period up to the regenerating process.

The following description will discuss one example of a manufacturing method for the honeycomb structural body of the present invention. In the case where the structure of the honeycomb structural body of the present invention is prepared as an integrated honeycomb structural body constituted by one sintered body as a whole as shown in FIG. 3, first, an extrusion molding process is carried out by using the above-mentioned material paste mainly composed of ceramics to manufacture a ceramic formed body having almost the same shape as the honeycomb structural body 30 shown in FIG. 3.

With respect to the material paste, not particularly limited, any material paste may be used as long as the porous ceramic block that has been manufactured is allowed to have an average pore diameter in a range from 5 to 30 μm with the rate of capacity of micro pores each having a pore diameter two or more times larger than the average pore diameter being set to 30% or less of the capacity of the entire micro pores, and, for example, a material, prepared by adding a binder and a dispersant solution to powder with a predetermined particle size made of the aforementioned ceramics, may be used.

With respect to the above-mentioned binder, not particularly limited, examples thereof include: methylcellulose, carboxy methylcellulose, hydroxy ethylcellulose, polyethylene glycol, phenolic resin and epoxy resin.

In general, the blended amount of the above-mentioned binder is desirably set to 1 to 10 parts by weight with respect to 100 parts by weight of ceramic powder.

With respect to the dispersant solution, not particularly limited, examples thereof include: an organic solvent such as benzene; alcohol such as methanol; and water.

An appropriate amount of the above-mentioned dispersant solution is mixed therein so that the viscosity of the material paste is set within a fixed range.

These ceramic powder, binder and dispersant solution are mixed by an attritor or the like, and sufficiently kneaded by a kneader or the like, and then extrusion-molded so that the above-mentioned ceramic formed body is manufactured.

Moreover, a molding auxiliary may be added to the material paste, if necessary.

With respect to the molding auxiliary, not particularly limited, examples thereof include: ethylene glycol, dextrin, fatty acid soap, polyalcohol and the like.

Furthermore, a pore-forming agent, such as balloons that are fine hollow spheres composed of oxide-based ceramics, spherical acrylic particles and graphite, may be added to the above-mentioned material paste, if necessary.

With respect to the above-mentioned balloons, not particularly limited, for example, alumina balloons, glass microballoons, shirasu balloons, fly ash balloons (FA balloons) and mullite balloons may be used. Among these, fly ash balloons are more desirably used.

Next, after the above-mentioned ceramic formed body has been dried by using a drier such as a microwave drier, a hot-air drier, a dielectric drier, a reduced-pressure drier, a vacuum drier and a frozen drier, predetermined through holes are filled with plug paste to form plugs so that a mouth sealing process for plugging the through holes is carried out. Here, the sealing process is carried out so that the size of the opening area of the gas flow-in through holes is made larger than the size of the opening area of the gas flow-out through holes.

With respect to the above-mentioned plug paste, not particularly limited, for example, the same material paste as the above-mentioned material paste may be used; however, those pastes, prepared by adding a lubricant, a solvent, a dispersant and a binder to ceramic powder used as the above-mentioned material paste, are desirably used. With this arrangement, it becomes possible to prevent ceramics particles in the plug paste from settling in the middle of the sealing process.

Next, the ceramic dried body filled with the plug paste is subjected to degreasing and firing processes under predetermined conditions so that a honeycomb structural body, made of porous ceramics and constituted by a single sintered body as a whole, is manufactured.

Here, with respect to the degreasing and firing conditions and the like of the ceramic dried body, it is possible to apply conditions that have been conventionally used for manufacturing a honeycomb structural body made of porous ceramics.

In the case where the structure of the honeycomb structural body of the present invention is prepared as an aggregated honeycomb structural body constituted by a plurality of porous ceramic members combined with one another through sealing material layers as shown in FIG. 1, first, an extrusion molding process is carried out by using the above-mentioned material paste mainly composed of ceramics to manufacture a raw ceramic formed body having a shape like a porous ceramic member 20 shown in FIG. 2.

Here, with respect to the material paste, the same material paste as described in the above-mentioned aggregated honeycomb structural body may be used.

After the above-mentioned raw molded body has been dried by using a microwave drier or the like to form a dried body, plug paste, which forms plugs, is injected into predetermined through holes of the dried body so that sealing processes for sealing the through holes are carried out.

Here, with respect to the plug paste, the same plug paste as that described in the above-mentioned integrated honeycomb structural body may be used, and with respect to the sealing process, the same method as the method for the above-mentioned integrated honeycomb structural body may be used except that the subject to be filled with the plug paste is different.

In this case also, the sealing processes are desirably carried out so that the size of opening areas of the gas flow-in through holes is made larger than the size of opening areas of the gas flow-out through holes.

Next, the dried body that has been subjected to the sealing process is subjected to degreasing and firing processes under predetermined conditions so that a porous ceramic member in which a plurality of through holes are placed in parallel with one another in the length direction with a partition wall interposed therebetween is manufactured.

Here, with respect to the conditions and the like of degreasing and firing processes for the raw molded body, those conditions conventionally used for manufacturing a honeycomb structural body constituted by a plurality of porous ceramic members that are combined with one another through sealing material layers may be used.

Next, sealing material paste to be used for forming a sealing material layer 14 is applied with an even thickness to form a sealing material paste layer, and on this sealing material paste layer, a process for laminating another porous ceramic member 20 is successively repeated so that a laminated body of porous ceramic members 20 having a rectangular pillar shape with a predetermined size is manufactured.

With respect to the material for forming the sealing material paste, since the same material as that described in the honeycomb structural body of the present invention can be used, the description thereof will not be given herein.

Next, the laminated body of the porous ceramic members 20 is heated so that the sealing material paste layer is dried and solidified to form the sealing material layer 14; thereafter, by cutting the peripheral portion into, for example, a shape as shown in FIG. 1, by using a diamond cutter or the like so that a ceramic block 15 is manufactured.

A sealing material layer 13 is formed on the circumference of the ceramic block 15 by using the sealing material paste so that a honeycomb structural body in which a plurality of porous ceramic members are combined with one another through sealing material layers is manufactured.

Any of the honeycomb structural bodies thus manufactured have a pillar shape, and the structures thereof are shown in FIG. 1 and FIG. 2.

With respect to the application of the honeycomb structural body of the present invention, although not particularly limited, it is desirably used for exhaust gas purifying devices for use in vehicles.

FIG. 6 is a cross-sectional view that schematically shows one example of an exhaust gas purifying device for use in vehicles, which is provided with the honeycomb structural body of the present invention.

As shown in FIG. 6, an exhaust gas purifying device 800 is mainly constituted by a honeycomb structural body 80 of the present invention, a casing 830 that covers the external portion of the honeycomb structural body 80, a holding sealing material 820 that is placed between the honeycomb structural body 80 and the casing 830 and heating means 810 placed on the exhaust gas inlet side of the honeycomb structural body 80, and an introducing pipe 840, which is connected to an internal combustion engine such as an engine, is connected to one end of the casing 830 on the exhaust gas inlet side, and an exhaust pipe 850 externally coupled is connected to the other end of the casing 830. In FIG. 6, arrows show flows of exhaust gases.

Moreover, in FIG. 6, the honeycomb structural body 80 may be prepared as the honeycomb structural body 10 shown in FIG. 1 or as the honeycomb structural body 30 shown in FIG. 3.

In the exhaust gas purifying device 800 having the above-mentioned arrangement, exhaust gases, discharged from the internal-combustion system such as an engine, are directed into the casing 830 through the introducing pipe 840, and allowed to flow into the honeycomb structural body 80 through the through holes and to pass through the wall portion (a partition wall); thus, the exhaust gases are purified, with particulates thereof being collected in the wall portion (a partition wall), and are then discharged outside through the exhaust pipe 850.

After a large quantity of particulates have been accumulated on the wall portion (a partition wall) of the honeycomb structural body 80 to cause an increase in pressure loss, the honeycomb structural body 80 is subjected to a regenerating process.

In the regenerating process, a gas, heated by using a heating means 810, is allowed to flow into the through holes of the honeycomb structural body 80 so that the honeycomb structural body 80 is heated to burn and eliminate the particulates deposited on the wall portion (a partition wall).

Moreover, in the present invention, in addition to the above-mentioned method, the particulates may be burned and eliminated by using a post-injection system.

Moreover, the honeycomb structural body of the present invention may have a catalyst capable of purifying CO, HC, NOx and the like in the exhaust gases deposited in the pores.

When such a catalyst is supported thereon, the honeycomb structural body of the present invention is allowed to function as a honeycomb structural body capable of collecting particulates in exhaust gases, and also to function as a catalyst converter for purifying CO, HC, NOx and the like contained in exhaust gases. Moreover, depending on cases, the honeycomb structural body makes it possible to lower the burning temperature of the particulates.

With respect to the catalyst, examples thereof include noble metals such as platinum, palladium and rhodium. The catalyst, made of a noble metal such as platinum, palladium or rhodium, is a so-called three-way catalyst, and the honeycomb structural body of the present invention which is provided with such a three-way catalyst is allowed to function in the same manner as conventionally known catalyst converters. Therefore, with respect to the case in which the honeycomb structural body of the present invention also functions as a catalyst converter, detailed description thereof will not be given herein.

Here, with respect to the catalyst that is supported on the honeycomb structural body of the present invention, not particularly limited to the above-mentioned noble metal, any catalyst may be supported thereon, as long as it can purify CO, HC, NOx and the like contained in exhaust gases.

EXAMPLES

The following description will discuss the present invention in detail by means of examples; however, the present invention is not intended to be limited by these examples.

Example 1

(1) Powder of α-type silicon carbide having an average particle size of 11 μm (±1 μm for the portion of 99.99% by weight thereof) (60% by weight), obtained by adjusting the grain size of a material using a sieve, and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a mixed composition. Next, after a slight amount of a plasticizer and a lubricant had been added and kneaded therein, the resulting mixture was extrusion-molded so that a raw formed product, which had almost the same cross-sectional shape as the cross-sectional shape shown in FIG. 4(b) and a ratio of opening areas of 3.00, was manufactured.

(2) Next, the above-mentioned raw formed product was dried by using a microwave drier or the like to form a ceramic dried body, and after predetermined through holes had been filled with a paste having the same composition as the raw formed product, the resulting product was again dried by using a drier, and then degreased at 400° C., and fired at 2000° C. in a normal-pressure argon atmosphere for 3 hours to manufacture a porous ceramic member, which was a silicon carbide sintered body, and had a porosity of 42%, an average pore diameter of 5 μm, with a rate of capacity of micro pores (hereinafter, referred to as pore diameter distribution) each having a pore diameter two times larger than the average pore diameter (10 μm in the present example) being set to 10%, a size of 34.3 mm×34.3 mm×150 mm, the number of through holes of 31 pcs/cm² and a thickness of substantially all the wall portion (a partition wall) 23 of 0.4 mm.

Here, with respect to end faces of the porous ceramic member thus obtained, an end face on one side of each of through holes 41a having a relatively large cross-sectional area was sealed with a plug, and an end face on the other side of each of through holes 41b having a relatively smaller cross-sectional area was sealed with a plug.

Here, the above-mentioned pore diameter was measured by using the following method:

With respect to the porous ceramic member, the pore diameter (0.2 to 500 μm) was measured by using a mercury injection method (in accordance with JIS R 1655:2003).

More specifically, a porous ceramic member having a honeycomb structure was cut into cubes having a size of about 0.8 cm, and these were washed by using ultrasonic-wave with ion exchanged water, and sufficiently dried. Next, the pore diameter of these samples were measured by using a Micromeritics automatic porosimeter, AutoPore III9405, manufactured by Shimadzu Corporation. In this case, the measuring range was set from 0.2 to 500 μm, and in the range from 100 to 500 μm, the measurements were carried out for every pressure unit of 0.1 psia, and in the range from 0.2 to 100 μm, the measurements were carried out for every pressure unit of 0.25 psia. Thus, the pore diameter distribution and the total micro pore capacity were calculated.

The average pore size (diameter) was calculated as, 4×S (integrated micro pore area)/V(integrated micro pore capacity).

Moreover, the pore diameter of twice as large as the average pore diameter was obtained, and the micro pore capacity of pores having the pore diameter exceeding the pore diameter of twice as large as the average was further calculated; moreover, based upon the measured data of total micro pore range and the rate of the micro pore diameter calculated as described above, the rate of the capacity of micro pores having the pore diameter exceeding the pore diameter twice as large as the average micro pore diameter, which relates to the present invention, was calculated.

Examples 2 to 12

Porous ceramic members were manufactured in the same manner as Example 1, except that the average pore diameter and the pore diameter distribution were changed to values as shown in Table 1. Here, the particle size of the material powder, firing conditions and the like are shown in Table 1. Moreover, the particle size of the material powder (α-type silicon carbide powder) was set to ±1 μm for the portion of 99.99% by weight thereof in the same manner as Example 1.

Comparative Examples 1 to 6

Porous ceramic members were manufactured in the same manner as Example 1, except that the average pore diameter and the pore diameter distribution were changed to values as shown in Table 1. Here, the particle size of the material powder, firing conditions and the like are shown in Table 1.

With respect to each of the porous ceramic members according to Examples 1 to 12 and Comparative Examples 1 to 6, respective ceramic blocks were manufactured, and the following measurements were carried out. Here, the manufacturing method of the ceramic block is shown below:

First, by using a heat resistant sealing material paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, a large number of the porous silicon carbide members were combined with one another, and this was then cut by using a diamond cutter to form a cylindrical shaped ceramic block.

In this case, the thickness of the sealing material layers used for combining the porous ceramic members was adjusted to 1.0 mm.

Next, ceramic fibers made of alumina silicate (shot content: 3%, fiber length: 0.1 to 100 mm) (23.3% by weight), which served as inorganic fibers, silicon carbide powder having an average particle size of 0.3 μm (30.2% by weight), which served as inorganic particles, silica sol ($SiO_2$ content in the sol: 30% by weight) (7% by weight), which served as an inorganic binder, carboxymethyl cellulose (0.5% by weight), which served as an organic binder, and water (39% by weight) were mixed and kneaded to prepare a sealing material paste.

Next, a sealing material paste layer having a thickness of 1.0 mm was formed on the circumferential portion of the ceramic block by using the above-mentioned sealing material paste. Further, this sealing material paste layer was dried at 120° C. so that a cylinder-shaped honeycomb structural body having a diameter of 144 mm and a length of 150 mm in the length direction, to be used as a honeycomb filter for purifying exhaust gases, was manufactured.

Further, the initial pressure loss and the pressure losses at the amounts of collected particulates of 0.5 g/l, 1 g/l, 2 g/l, 4 g/l, 6 g/l and 8 g/l and the regenerating limit value of the above-mentioned cylinder-shaped honeycomb structural body were measured, and the results are shown in Table 1.

(Evaluation Method)
(1) Pressure Loss Measurement

As shown in FIG. 6, each of the honeycomb structural bodies of the examples and comparative examples was placed in an exhaust passage of an engine to form an exhaust gas purifying device, and the engine was driven at the number of revolutions of 3000 $min^{-1}$ and a torque of 50 Nm so that the pressure losses in the initial state and upon collection of a predetermined amount of particulates were measured.

(2) Measurement on Regenerating Limit Value

As shown in FIG. 6, each of the honeycomb structural bodies according to the examples and comparative examples was placed in an exhaust passage of an engine to form an exhaust gas purifying device, and the engine was driven at the number of revolutions of 3000 $min^{-1}$ and a torque of 50 Nm for a predetermined period of time so that samples that had collected particulates were obtained.

Next, the engine was driven at the number of revolutions of 4000 $min^{-1}$ and a torque of 200 Nm, and when the filter temperature had become constant in the vicinity of 700° C., the engine was maintained at the number of revolutions of 1050 $min^{-1}$ and a torque of 30 Nm so that the particulates collected in the filter were forcefully burned. This experiment was carried out in the same manner on several filters, and the greatest amount of particulates that would cause no cracks was measured, and the resulting value was determined as the regenerating limit value.

TABLE 1

| | Average pore diameter (μm) | Pore diameter distribution (%) | Porosity (%) | Particle diameter (μm) | Mixing ratio | Firing condition (° C.) | Initial loss | Loss upon collecting particulates | | | | | | Regenerating limit value g/l |
|---|---|---|---|---|---|---|---|---|---|---|---|---|---|---|
| | | | | | | | | 0.5 g/l | 1 g/l | 2 g/l | 4 g/l | 6 g/l | 8 g/l | |
| Example 1 | 5 | 10 | 42 | 11:0.5 | 60:40 | 2000 | 2.1 | 3.5 | 4.1 | 5.1 | 7 | 9.2 | 11.6 | 9.4 |
| Example 2 | 5 | 20 | 40 | 13:0.5 | 60:40 | 2050 | 2.1 | 3.4 | 3.9 | 4.8 | 6.8 | 9 | 11.4 | 9.2 |
| Example 3 | 5 | 30 | 40 | 15:0.5 | 60:40 | 2050 | 2 | 3.6 | 4.3 | 5.4 | 7.5 | 9.9 | 12.3 | 9 |
| Example 4 | 10 | 10 | 42 | 10:0.5 | 60:40 | 2200 | 1.7 | 3.1 | 3.6 | 4.6 | 6.6 | 8.8 | 11.2 | 9.4 |
| Example 5 | 10 | 20 | 40 | 20:0.5 | 60:40 | 2150 | 1.7 | 3.1 | 3.9 | 5 | 7 | 9.3 | 11.7 | 9.4 |
| Example 6 | 10 | 30 | 38 | 30:0.5 | 60:40 | 2100 | 1.7 | 3.1 | 3.7 | 5.6 | 7.6 | 9.9 | 12.4 | 9.2 |
| Example 7 | 20 | 10 | 42 | 25:0.5 | 60:40 | 2250 | 1.6 | 2.9 | 3.7 | 4.8 | 6.8 | 9.1 | 11.5 | 8.8 |
| Example 8 | 20 | 20 | 40 | 30:0.5 | 60:40 | 2200 | 1.6 | 2.9 | 3.9 | 5.2 | 7.3 | 9.6 | 12 | 8.8 |
| Example 9 | 20 | 30 | 38 | 40:0.5 | 60:40 | 2150 | 1.6 | 2.8 | 3.6 | 5.6 | 7.8 | 10.2 | 12.7 | 8.6 |
| Example 10 | 30 | 10 | 42 | 40:0.5 | 60:40 | 2250 | 1.5 | 2.7 | 3.1 | 4.6 | 6.8 | 9.3 | 11.7 | 8.5 |
| Example 11 | 30 | 20 | 40 | 50:0.5 | 60:40 | 2200 | 1.5 | 2.6 | 2.9 | 4.6 | 7.2 | 9.8 | 12.4 | 8.5 |
| Example 12 | 30 | 30 | 38 | 60:0.5 | 60:40 | 2150 | 1.5 | 2.6 | 2.8 | 4.4 | 7.6 | 10.3 | 12.9 | 8.5 |
| Comparative Example 1 | 0.5 | 10 | 42 | 3:0.5 | 60:40 | 1900 | 2.4 | 4.1 | 4.9 | 6.3 | 8.7 | 11.3 | 14.1 | 5.8 |
| Comparative Example 2 | 5 | 35 | 40 | 17:0.5 | 60:40 | 2050 | 2.1 | 3.7 | 4.6 | 6.1 | 8.4 | 11.1 | 13.9 | 8 |
| Comparative Example 3 | 10 | 35 | 38 | 35:0.5 | 60:40 | 2100 | 1.8 | 3.2 | 3.7 | 5.9 | 8.3 | 10.8 | 13.6 | 8 |
| Comparative Example 4 | 20 | 35 | 38 | 45:0.5 | 60:40 | 2100 | 1.6 | 2.7 | 3.5 | 6.2 | 8.5 | 11.2 | 14.1 | 7.9 |
| Comparative Example 5 | 30 | 35 | 38 | 70:0.5 | 60:40 | 2130 | 1.5 | 2.5 | 3.1 | 4.7 | 8.5 | 11.3 | 14.4 | 7.8 |
| Comparative Example 6 | 35 | 10 | 38 | 45:0.5 | 60:40 | 2250 | 1.5 | 2.4 | 3.1 | 4.6 | 8.2 | 10.8 | 13.9 | 7.8 |

Note)
Pore diameter distribution: the rate of capacity of micro pores having a pore diameter two or more times larger than the average pore diameter.

As clearly indicated by Table 1, although there are some cases in which the initial pressure loss in the honeycomb structural bodies according to the comparative examples is lower than that of the honeycomb structural bodies according to the examples, the honeycomb structural bodies according to the comparative examples generally have a higher pressure loss upon collection of 4 g/l of particulates in comparison with the honeycomb structural bodies of the examples, and the pressure loss upon collection of 8 g/l of particulates, is reduced to a low level in the honeycomb structural bodies according to the examples.

This is presumably because particulates penetrate to reach deep layer portions in the wall portion in the honeycomb structural bodies of the comparative examples, while particulates are collected by only surface layer portions of the wall portion in the honeycomb structural bodies of the examples.

Moreover, the honeycomb structural bodies according to the examples have a greater regenerating limit value in comparison with the filters according to the comparative examples so that a larger amount of particulates can be collected up to the regenerating process; thus, it becomes possible to prolong the period of time up to the regenerating process.

Example 13

(1) The same processes as (1) of Example 1 were carried out to prepare a mixed composition. Next, after a slight amount of a plasticizer and a lubricant had been added to the mixed composition and further kneaded, the resulting mixed composition was subjected to an extrusion molding process to manufacture a raw ceramic formed body having a cross-sectional shape as shown in FIG. 9 with a ratio of opening areas of 3.00. Here, the particle size of the material powder (α-type silicon carbide powder) was set to ±1 μm for the portion of 99.99% by weight thereof in the same manner as Example 1.

(2) Next, the above-mentioned raw formed product was dried by using a microwave drier or the like to form a ceramic dried body, and after predetermined through holes had been filled with a paste having the same composition as the raw formed product, the resulting product was again dried by using a drier, and then degreased at 400° C., and fired at 2000° C. in a normal-pressure argon atmosphere for 3 hours to manufacture a porous ceramic member, which was a silicon carbide sintered body, and had a porosity of 42%, an average pore diameter of 5 μm, a pore diameter distribution of 10%, a size of 34.3 mm×34.3 mm×150 mm, the number of through holes of 31 pcs/cm$^2$ and a thickness of substantially all the wall portion (a partition wall) 23 of 0.4 mm.

Here, with respect to end faces of the porous ceramic member thus obtained, either one of end faces was sealed with a plug so as to adjust the ratio of opening areas to the above-mentioned size.

Examples 14 to 17

The same processes as Example 13 were carried out except that the average pore diameter and the pore diameter distribution were set to values as shown in Table 2 to manufacture a porous ceramic member. Here, the particle size of the material powder (α-type silicon carbide powder) was set to ±1 μm for the portion of 99.99% by weight thereof in the same manner as Example 1.

Comparative Examples 7 to 9

The same processes as Example 13 were carried out except that the average pore diameter and the pore diameter distribution were set to values as shown in Table 2 to manufacture a porous ceramic member. Here, the particle size of the material powder, the firing conditions and the like are shown in Table 2.

The porous ceramic members according to Examples 14 to 17 and Comparative Examples 7 to 9 were formed into cylinder-shaped honeycomb structural bodies having the same structure as that of Example 1, and the initial pressure loss, the pressure loss upon collection of a predetermined amount of particulates and the regenerating limit value were respectively measured. The results are shown in Table 2.

Here, the measurements of the pore diameter and the like, the measurements of the pressure loss and the measurements of the regenerating limit value were carried out by using the same methods as Example 1.

TABLE 2

| | Average pore diameter (μm) | Pore diameter distribution (%) | Porosity (%) | Particle diameter (μm) | Mixing ratio | Firing condition (° C.) | Initial loss | Loss upon collecting particulates | | | | | | Regenerating limit value g/l |
|---|---|---|---|---|---|---|---|---|---|---|---|---|---|---|
| | | | | | | | | 0.5 g/l | 1 g/l | 2 g/l | 4 g/l | 6 g/l | 8 g/l | |
| Example 13 | 5 | 10 | 42 | 11:0.5 | 60:40 | 2000 | 3.8 | 6.2 | 7.1 | 8.4 | 10.4 | 13.2 | 15.6 | 8.2 |
| Example 14 | 10 | 10 | 42 | 10:0.5 | 60:40 | 2200 | 3.3 | 5.7 | 6.6 | 7.8 | 9.9 | 12.6 | 15.2 | 8 |
| Example 15 | 10 | 20 | 40 | 20:0.5 | 60:40 | 2150 | 3.3 | 5.7 | 6.9 | 8.2 | 10.4 | 13.1 | 15.8 | 8 |
| Example 16 | 10 | 30 | 38 | 30:0.5 | 60:40 | 2100 | 3.3 | 5.7 | 6.7 | 8.8 | 10.9 | 13.8 | 16.4 | 7.8 |
| Example 17 | 30 | 10 | 42 | 40:0.5 | 60:40 | 2250 | 3 | 5.2 | 6.1 | 7.8 | 10.2 | 13.2 | 15.9 | 7.6 |
| Comparative Example 7 | 0.5 | 10 | 42 | 3:0.5 | 60:40 | 1900 | 4.1 | 6.8 | 7.9 | 9.5 | 12.1 | 15.2 | 18.2 | 5.8 |
| Comparative Example 8 | 10 | 35 | 38 | 35:0.5 | 60:40 | 2100 | 3.4 | 5.8 | 6.6 | 9.1 | 11.8 | 14.9 | 17.7 | 7.3 |
| Comparative Example 9 | 35 | 10 | 38 | 45:0.5 | 60:40 | 2250 | 3 | 4.9 | 6.1 | 7.8 | 11.5 | 14.7 | 18.1 | 7.2 |

Note)
Pore diameter distribution: the rate of capacity of micro pores having a pore diameter two or more times larger than the average pore diameter.

As clearly indicated by Table 2, although there are some cases in which the initial pressure loss in the honeycomb structural bodies according to the comparative examples is lower than that of the honeycomb structural bodies according to the examples, the honeycomb structural bodies according to the comparative examples generally have a higher pressure loss upon collection of 4 g/l of particulates in comparison with the honeycomb structural bodies of the examples, and the pressure loss upon collection of 8 g/l of particulates is reduced to a low level in the honeycomb structural bodies according to the examples.

This is presumably because particulates penetrate to reach deep layer portions in the wall portion in the honeycomb structural bodies of the comparative examples, while particulates are collected by only surface layer portions of the wall portion in the honeycomb structural bodies of the examples.

Moreover, the honeycomb structural bodies according to the examples have a greater regenerating limit value in comparison with the filters according to the comparative examples so that a larger amount of particulates can be collected up to the regenerating process; thus, it becomes possible to prolong the period of time up to the regenerating process.

Example 18

(1) The same processes as (1) of Example 1 were carried out to prepare a mixed composition. Next, after a slight amount of a plasticizer and a lubricant had been added to the mixed composition and further kneaded, the resulting mixed composition was subjected to an extrusion molding process to manufacture a raw ceramic formed body having a cross-sectional shape as shown in FIG. 10 with a ratio of opening areas of 3.00. Here, the particle size of the material powder (α-type silicon carbide powder) was set to ±1 μm for the portion of 99.99% by weight thereof in the same manner as Example 1.

(2) Next, the above-mentioned raw formed product was dried by using a microwave drier or the like to form a ceramic dried body, and after predetermined through holes had been filled with a paste having the same composition as the raw formed product, the resulting product was again dried by using a drier, and then degreased at 400° C., and fired at 2000° C. in a normal-pressure argon atmosphere for 3 hours to manufacture a porous ceramic member, which was a silicon carbide sintered body, and had a porosity of 42%, an average pore diameter of 5 μm, a pore diameter distribution of 10%, a size of 34.3 mm×34.3 mm×150 mm, the number of through holes of 31 pcs/cm$^2$ and a thickness of substantially all the wall portion (a partition wall) 23 of 0.4 mm.

Here, with respect to end faces of the porous ceramic member thus obtained, an end face on one side of each of through holes 321 having a relatively large cross-sectional area was sealed with a plug, and an end face on the other side of each of through holes 322 having a relatively smaller cross-sectional area was sealed with a plug.

Examples 19 to 22

The same processes as Example 18 were carried out except that the average pore diameter and the pore diameter distribution were set to values as shown in Table 3 to manufacture a porous ceramic member. Here, the particle size of the material powder (α-type silicon carbide powder) was set to ±1 μm for the portion of 99.99% by weight thereof in the same manner as Example 1.

Comparative Examples 10 to 12

The same processes as Example 18 were carried out except that the average pore diameter and the pore diameter distribution were set to values as shown in Table 3 to manufacture a porous ceramic member. Here, the particle size of the material powder, the firing conditions and the like are shown in Table 3.

The porous ceramic members according to Examples 18 to 22 and Comparative Examples 10 to 12 were formed into cylinder-shaped honeycomb structural bodies having the same structure as that of Example 1, and the initial pressure loss, the pressure loss upon collection of a predetermined amount of particulates and the regenerating limit value were respectively measured. The results are shown in Table 3.

Here, the measurements of the pore diameter and the like, the measurements of the pressure loss and the measurements of the regenerating limit value were carried out by using the same methods as Example 1.

TABLE 3

| | Average pore diameter (μm) | Pore diameter distribution (%) | Porosity (%) | Particle diameter (μm) | Mixing ratio | Firing condition (° C.) | Initial loss | Loss upon collecting particulates | | | | | | Regenerating limit value g/l |
|---|---|---|---|---|---|---|---|---|---|---|---|---|---|---|
| | | | | | | | | 0.5 g/l | 1 g/l | 2 g/l | 4 g/l | 6 g/l | 8 g/l | |
| Example 18 | 5 | 10 | 42 | 11:0.5 | 60:40 | 2000 | 3.2 | 5.5 | 6.3 | 7.7 | 10.2 | 13.6 | 17.6 | 8.5 |
| Example 19 | 10 | 10 | 42 | 10:0.5 | 60:40 | 2200 | 2.8 | 5.1 | 5.8 | 7.2 | 9.8 | 13.2 | 17.1 | 8.2 |
| Example 20 | 10 | 20 | 40 | 20:0.5 | 60:40 | 2150 | 2.8 | 5.1 | 6 | 7.6 | 10.2 | 13.7 | 17.6 | 8.2 |
| Example 21 | 10 | 30 | 38 | 30:0.5 | 60:40 | 2100 | 2.8 | 5.1 | 5.8 | 7.9 | 10.8 | 14.2 | 18.4 | 8 |
| Example 22 | 30 | 10 | 42 | 40:0.5 | 60:40 | 2250 | 2.6 | 4.8 | 5.5 | 7.2 | 10 | 13.4 | 17.5 | 7.7 |
| Comparative Example 10 | 0.5 | 10 | 42 | 3:0.5 | 60:40 | 1900 | 3.5 | 5.9 | 6.8 | 8.9 | 11.9 | 15.5 | 19.7 | 5.8 |
| Comparative Example 11 | 10 | 35 | 38 | 35:0.5 | 60:40 | 2100 | 2.8 | 5.2 | 5.9 | 8.1 | 11.2 | 14.7 | 19 | 7.5 |
| Comparative Example 12 | 35 | 10 | 38 | 45:0.5 | 60:40 | 2250 | 2.6 | 4.7 | 5.6 | 7.6 | 10.7 | 14.5 | 18.9 | 7.3 |

Note)
Pore diameter distribution: the rate of capacity of micro pores having a pore diameter two or more times larger than the average pore diameter.

As clearly indicated by Table 3, although there are some cases in which the initial pressure loss in the honeycomb structural bodies according to the comparative examples is lower than that of the honeycomb structural bodies according to the examples, the honeycomb structural bodies according to the comparative examples generally have a higher pressure loss upon collection of 4 g/l of particulates in comparison with the honeycomb structural bodies of the examples, and the pressure loss upon collection of 8 g/l of particulates is reduced to a low level in the honeycomb structural bodies according to the examples.

This is presumably because particulates penetrate to reach deep layer portions in the wall portion in the honeycomb structural bodies of the comparative examples, while particulates are collected by only surface layer portions of the wall portion in the honeycomb structural bodies of the examples.

Moreover, the honeycomb structural bodies according to the examples have a greater regenerating limit value in comparison with the filters according to the comparative examples so that a larger amount of particulates can be collected up to the regenerating process; thus, it becomes possible to prolong the period of time up to the regenerating process.

Example 23

(1) The same processes as (1) of Example 1 were carried out to prepare a mixed composition. Next, after a slight amount of a plasticizer and a lubricant had been added to the mixed composition and further kneaded, the resulting mixed composition was subjected to an extrusion molding process to manufacture a raw ceramic formed body having a cross-sectional shape as shown in FIG. 12 with a ratio of opening areas of 3.00. Here, the particle size of the material powder (α-type silicon carbide powder) was set to ±1 μm for the portion of 99.99% by weight thereof in the same manner as Example 1.

(2) Next, the above-mentioned raw formed product was dried by using a microwave drier or the like to form a ceramic dried body, and after predetermined through holes had been filled with a plug paste having the same composition as the raw formed product, the resulting product was again dried by using a drier, and then degreased at 400° C., and fired at 2000° C. in a normal-pressure argon atmosphere for 3 hours to manufacture a porous ceramic member, which was a silicon carbide sintered body, and had a porosity of 42%, an average pore diameter of 5 μm, a pore diameter distribution of 10%, a size of 34.3 mm×34.3 mm×150 mm, the number of through holes of 31 pcs/cm² and a thickness of substantially all the wall portion (the partition wall) 23 of 0.4 mm.

Here, with respect to end faces of the porous ceramic member thus obtained, an end face on one side of each of through holes 341 having a relatively large cross-sectional area was sealed with a plug, and an end face on the other side of each of through holes 342 having a relatively smaller cross-sectional area was sealed with a plug.

Examples 24 to 27

The same processes as Example 23 were carried out except that the average pore diameter and the pore diameter distribution were set to values as shown in Table 4 to manufacture a porous ceramic member. Here, the particle size of the material powder (α-type silicon carbide powder) was set to ±1 μm for the portion of 99.99% by weight thereof in the same manner as Example 1.

Comparative Examples 13 to 15

The same processes as Example 23 were carried out except that the average pore diameter and the pore diameter distribution were set to values as shown in Table 4 to manufacture a porous ceramic member. Here, the particle size of the material powder, the firing conditions and the like are shown in Table 4.

The porous ceramic members according to Examples 23 to 27 and Comparative Examples 13 to 15 were formed into cylinder-shaped honeycomb structural bodies having the same structure as that of Example 1, and the initial pressure loss, the pressure loss upon collection of a predetermined amount of particulates and the regenerating limit value were respectively measured. The results are shown in Table 4.

Here, the measurements of the pore diameter and the like, the measurements of the pressure loss and the measurements of the regenerating limit value were carried out by using the same methods as Example 1.

TABLE 4

|  | Average pore diameter (μm) | Pore diameter distribution (%) | Porosity (%) | Particle diameter (μm) | Mixing ratio | Firing condition (° C.) | Initial loss | Loss upon collecting particulates | | | | | | Regenerating limit value g/l |
|---|---|---|---|---|---|---|---|---|---|---|---|---|---|---|
|  |  |  |  |  |  |  |  | 0.5 g/l | 1 g/l | 2 g/l | 4 g/l | 6 g/l | 8 g/l |  |
| Example 23 | 5 | 10 | 42 | 11:0.5 | 60:40 | 2000 | 2.1 | 3.2 | 3.9 | 5.5 | 7.7 | 10.9 | 14.3 | 8 |
| Example 24 | 10 | 10 | 42 | 10:0.5 | 60:40 | 2200 | 1.7 | 2.7 | 3.4 | 4.9 | 7.2 | 10.4 | 13.6 | 7.8 |
| Example 25 | 10 | 20 | 40 | 20:0.5 | 60:40 | 2150 | 1.7 | 2.7 | 3.7 | 5.4 | 7.8 | 11 | 14.4 | 7.8 |
| Example 26 | 10 | 30 | 38 | 30:0.5 | 60:40 | 2100 | 1.7 | 2.7 | 3.4 | 5.8 | 8.3 | 11.6 | 14.9 | 7.6 |
| Example 27 | 30 | 10 | 42 | 40:0.5 | 60:40 | 2250 | 1.5 | 2.4 | 3 | 4.9 | 7.5 | 11.1 | 14.5 | 7.5 |
| Comparative Example 13 | 0.5 | 10 | 42 | 3:0.5 | 60:40 | 1900 | 2.3 | 4.3 | 5.2 | 6.7 | 9.2 | 11.9 | 15.2 | 5.8 |
| Comparative Example 14 | 10 | 35 | 38 | 35:0.5 | 60:40 | 2100 | 1.8 | 2.6 | 3.3 | 6.1 | 8.7 | 12.1 | 15.5 | 7.2 |
| Comparative Example 15 | 35 | 10 | 38 | 45:0.5 | 60:40 | 2250 | 1.5 | 2.3 | 3.1 | 4.9 | 8.8 | 12.5 | 16.2 | 7 |

Note)
Pore diameter distribution: the rate of capacity of micro pores having a pore diameter two or more times larger than the average pore diameter.

As clearly indicated by Table 4, although there are some cases in which the initial pressure loss in the honeycomb structural bodies according to the comparative examples is lower than that of the honeycomb structural bodies according to the examples, the honeycomb structural bodies according to the comparative examples generally have a higher pressure loss upon collection of 4 g/l of particulates in comparison with the honeycomb structural bodies of the examples, and the pressure loss upon collection of 8 g/l of particulates, is reduced to a low level in the honeycomb structural bodies according to the examples.

This is presumably because particulates penetrate to reach deep layer portions in the wall portion in the honeycomb structural bodies of the comparative examples, while particulates are collected by only surface layer portions of the wall portion in the honeycomb structural bodies of the examples.

Moreover, the honeycomb structural bodies according to the examples have a greater regenerating limit value in comparison with the filters according to the comparative examples so that a larger amount of particulates can be collected up to the regenerating process; thus, it becomes possible to prolong the period of time up to the regenerating process.

Moreover, in all the examples and comparative examples, with respect to honeycomb structural bodies according to Example 3 and Comparative Example 2; to Example 6 and Comparative Example 3; to Example 9 and Comparative Example 4; to Example 16 and Comparative Example 8; to Example 21 and Comparative Example 11; as well as to Example 26 and Comparative Example 14, the pressure losses upon collection of 8 g/l of particulates are compared with each other, and in the case of the honeycomb structural bodies having a partition wall that separate gas flow-in through holes as shown in FIGS. 4 and 9, by reducing the pore diameter distribution to 30% or less, the pressure loss is reduced to 92% or less in comparison with the case in which the pore diameter distribution exceeds 30% (in the case of 35%); in contrast, in the case of the honeycomb structural bodies having no partition wall that separate gas flow-in through holes as shown in FIGS. 10 and 12, when the pore diameter distribution is reduced to 30% or less, the pressure loss reduction remains at about 95% in comparison with the case in which the pore diameter distribution exceeds 30% (in the case of 35%). Moreover, in the case where the pressure losses upon collection of 4 g/l and 6 g/l of particulates were compared with each other, the same results were obtained.

This shows that the effects of the present invention are remarkably exerted in the honeycomb structural body having a partition wall that separate gas flow-in through holes.

Figure 1:
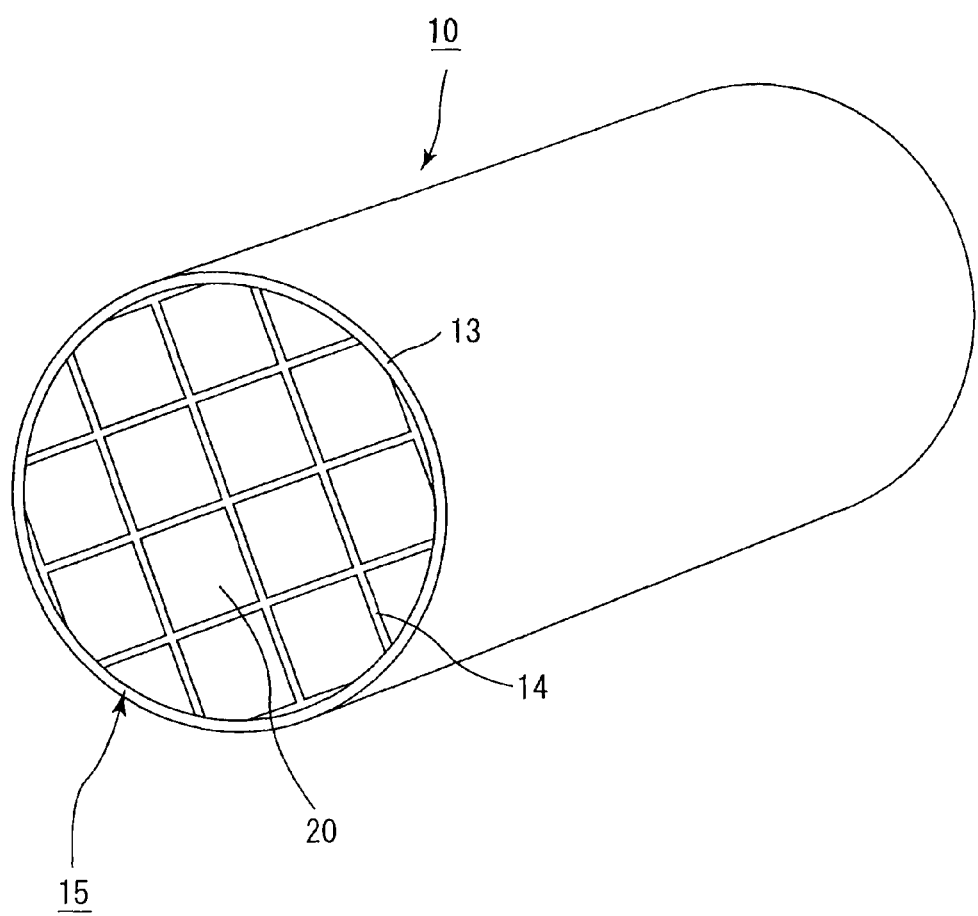
FIG. 1 is a perspective view schematically showing a specific example of an aggregated honeycomb structural body as one example of a honeycomb structural body of the present invention.
Figure 2:
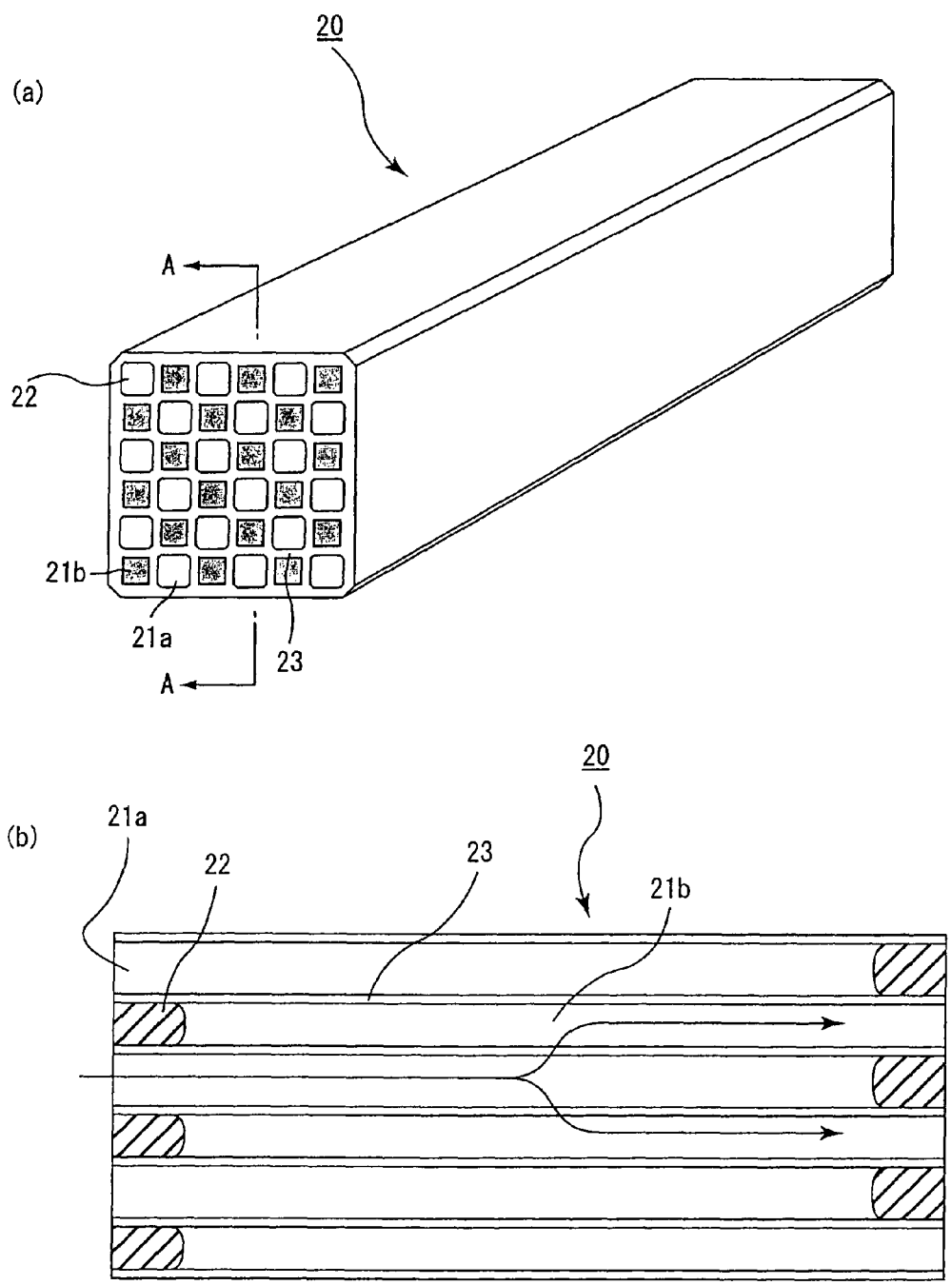
FIG. 2(a) is a perspective view schematically showing one example of a porous ceramic member which constitutes the honeycomb structural body shown in FIG. 1.
FIG. 2(b) is a cross-sectional view taken along line A-A of the porous ceramic member shown in FIG. 2(a).
Figure 3:
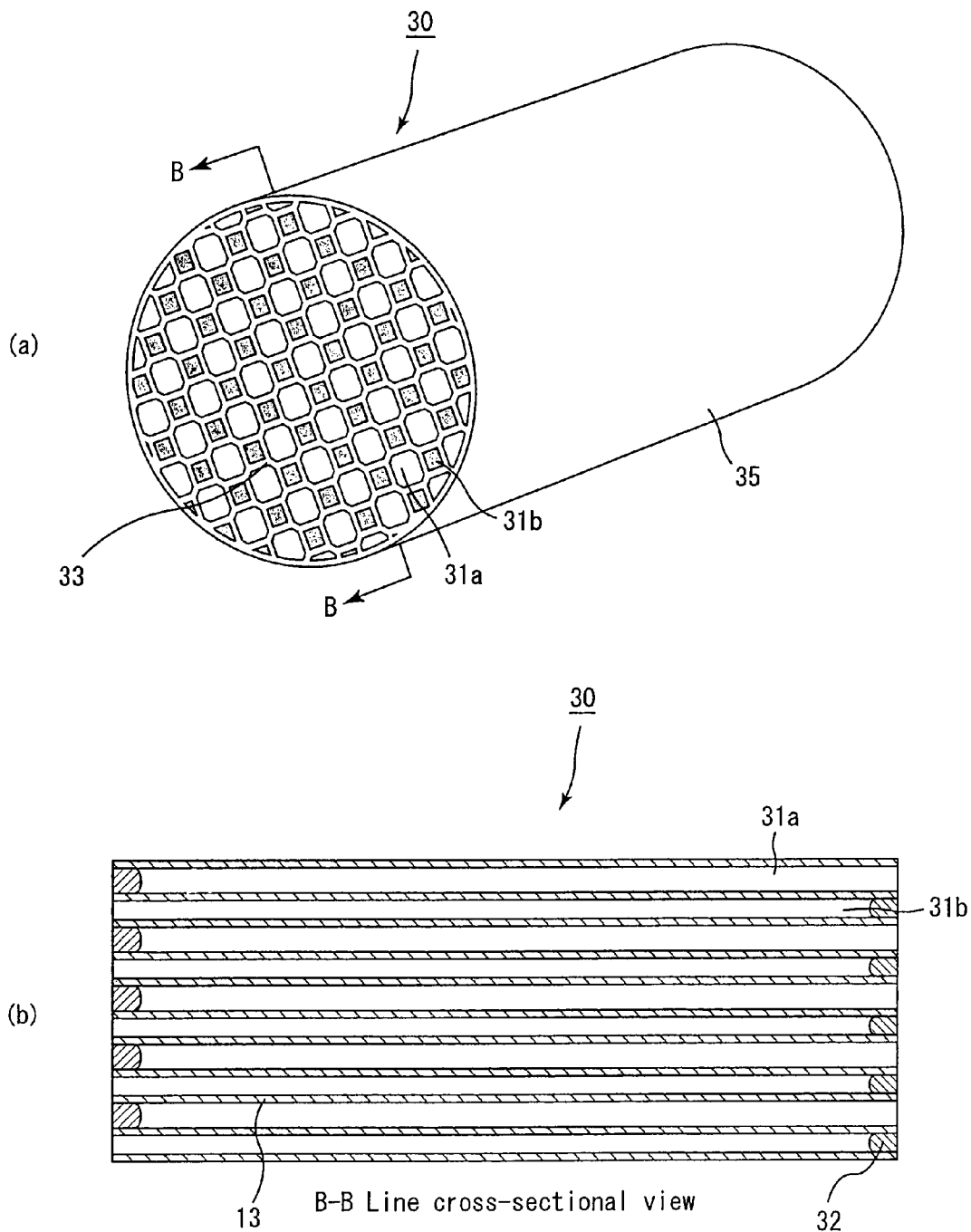
FIG. 3(a) is a perspective view schematically showing a specific example of an integrated honeycomb structural body as another example of the honeycomb structural body of the present invention.
FIG. 3(b) is a cross-sectional view taken along line B-B thereof.
Figure 4:
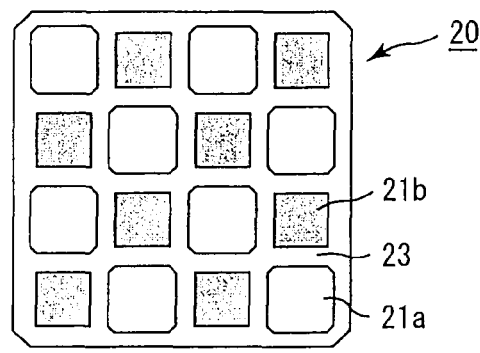
FIGS. 4(a) to 4(d) are cross-sectional views each schematically showing a part of a cross-section of the porous ceramic member which constitutes the aggregated honeycomb structural body of the present invention.
Figure 4:
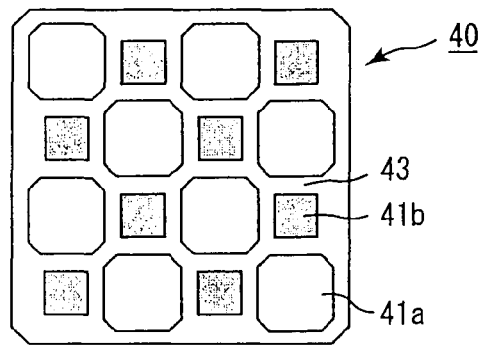
Figure 4:
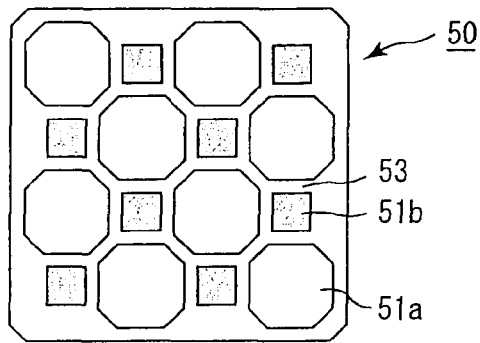
Figure 4:
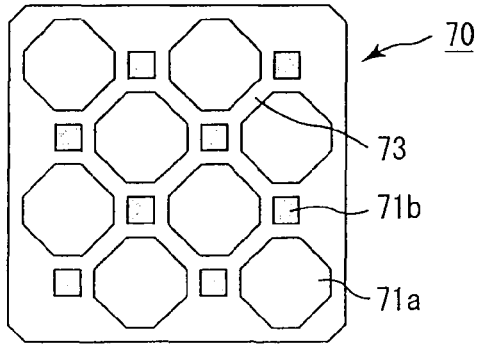
Figure 5:
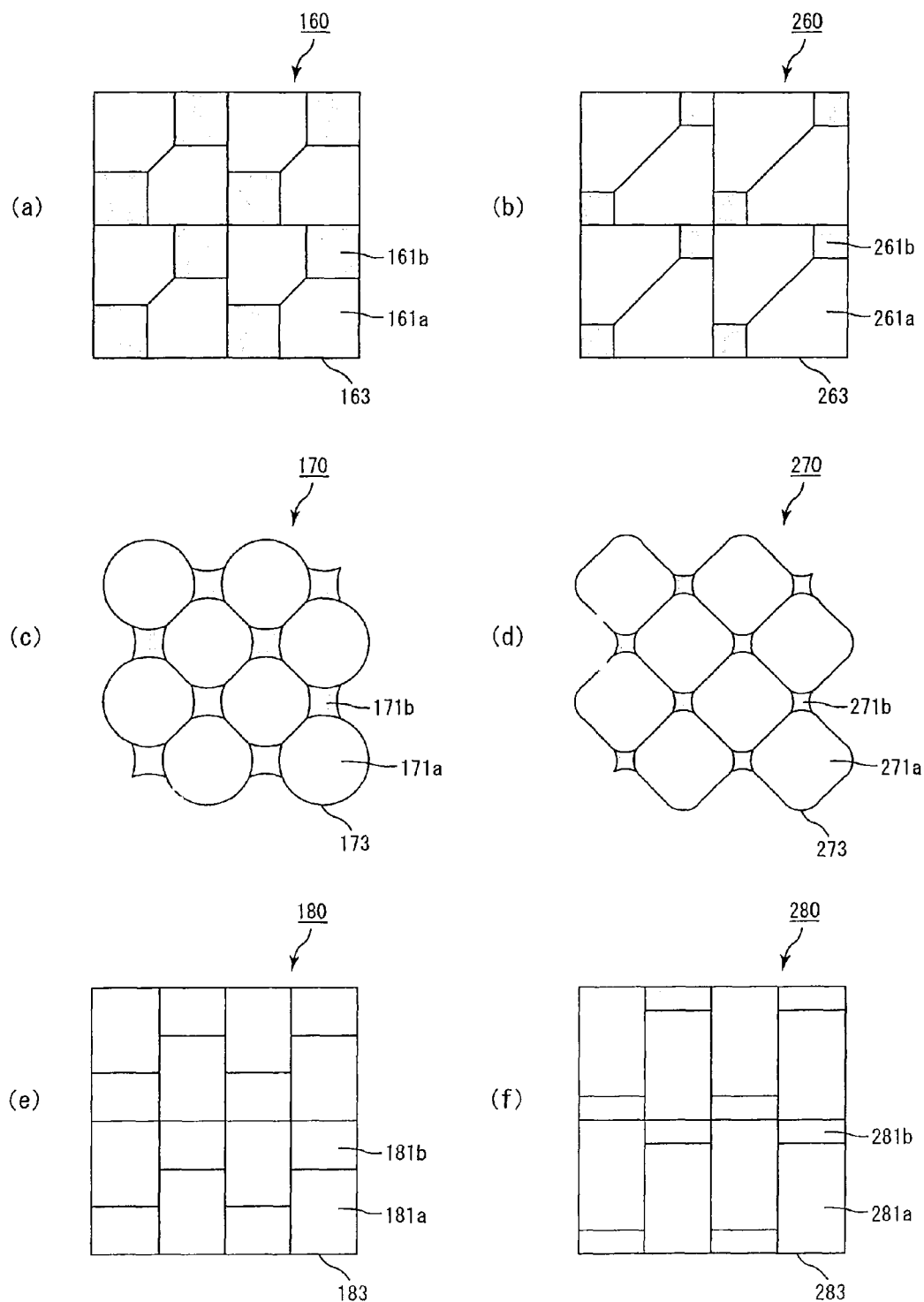
FIGS. 5(a) to 5(f) are cross-sectional views each schematically showing a part of a cross-section of the porous ceramic member which constitutes the aggregated honeycomb structural body of the present invention.
Figure 6:
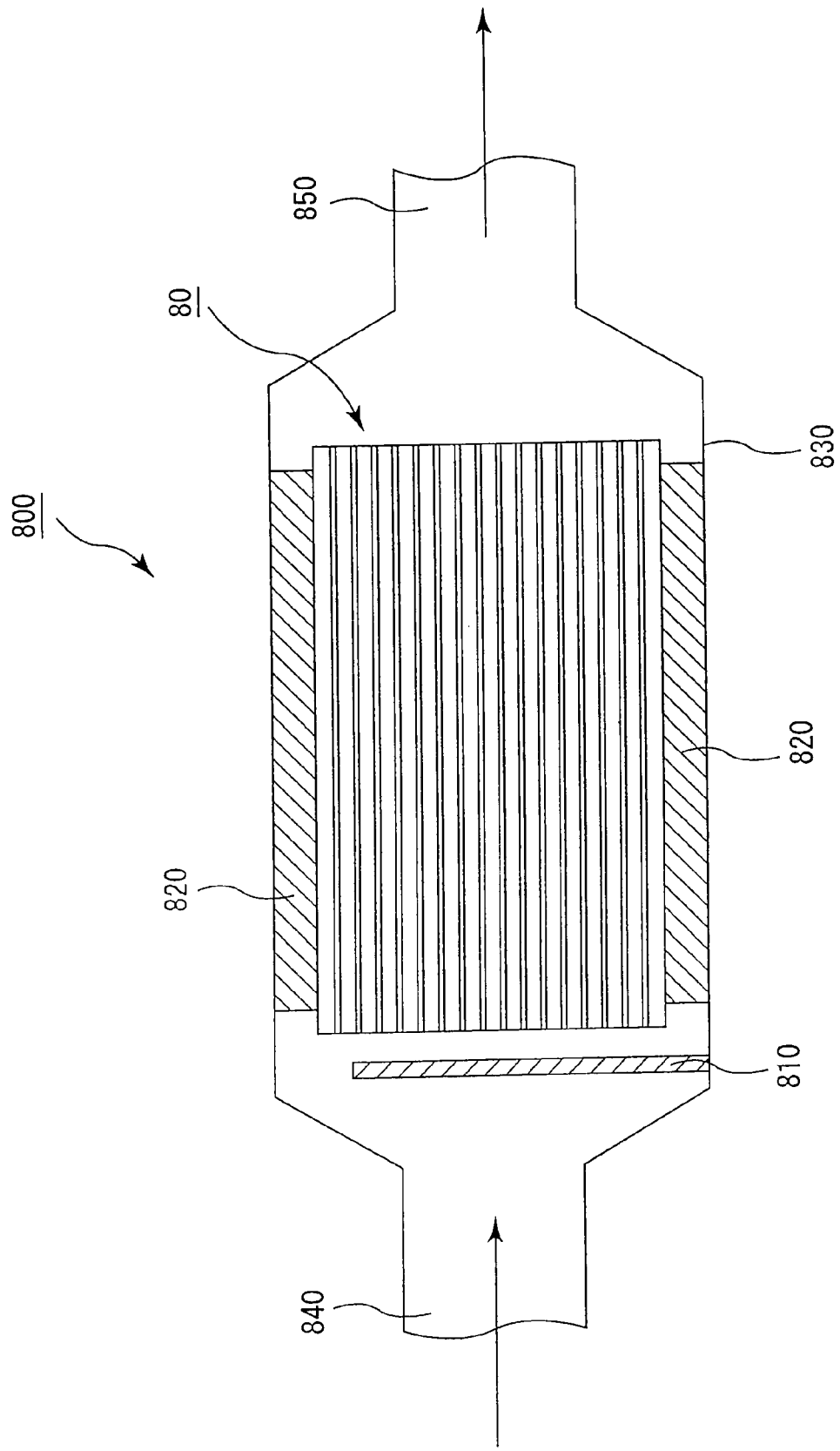
FIG. 6 is a cross-sectional view schematically showing one example of an exhaust gas purifying device for a vehicle in which the honeycomb structural body of the present invention is installed.
Figure 7:
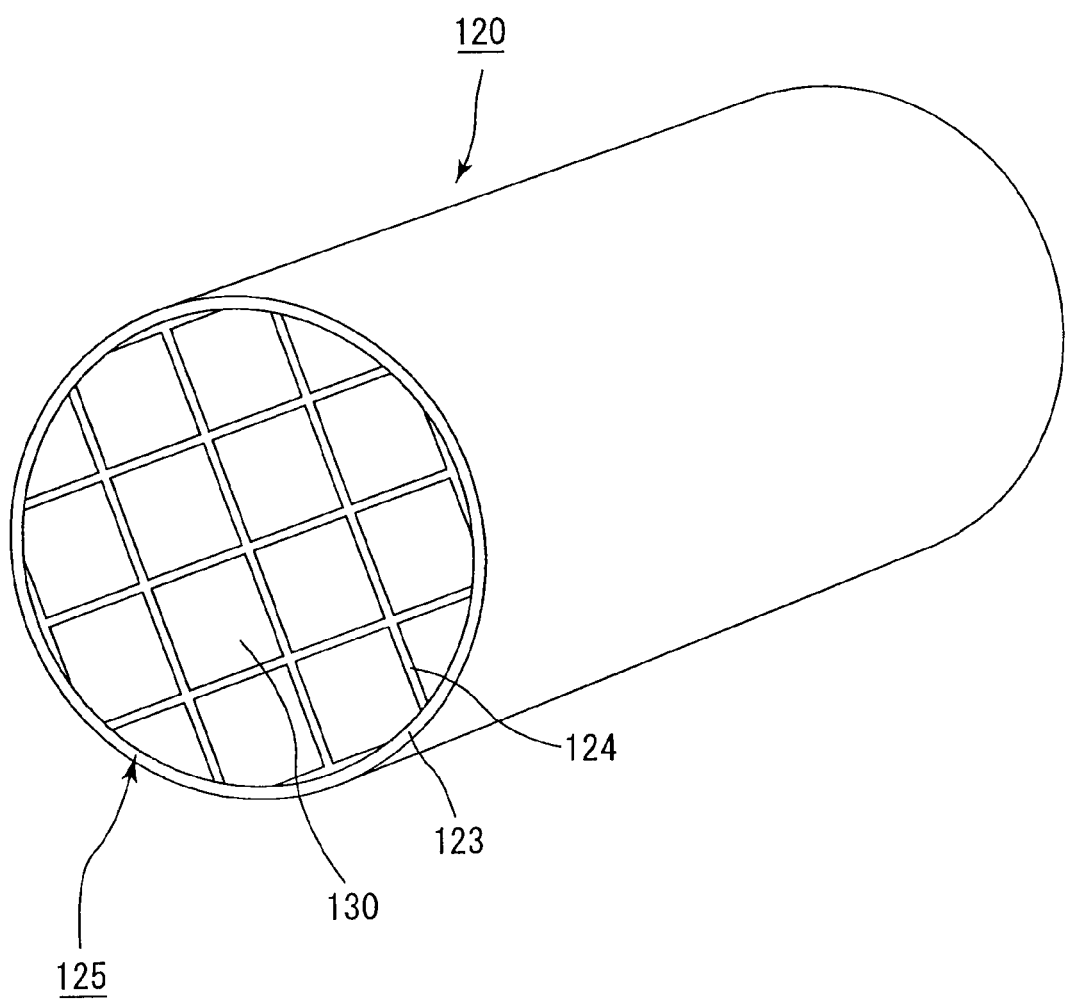
FIG. 7 is a perspective view schematically showing a conventional honeycomb structural body.
Figure 8:
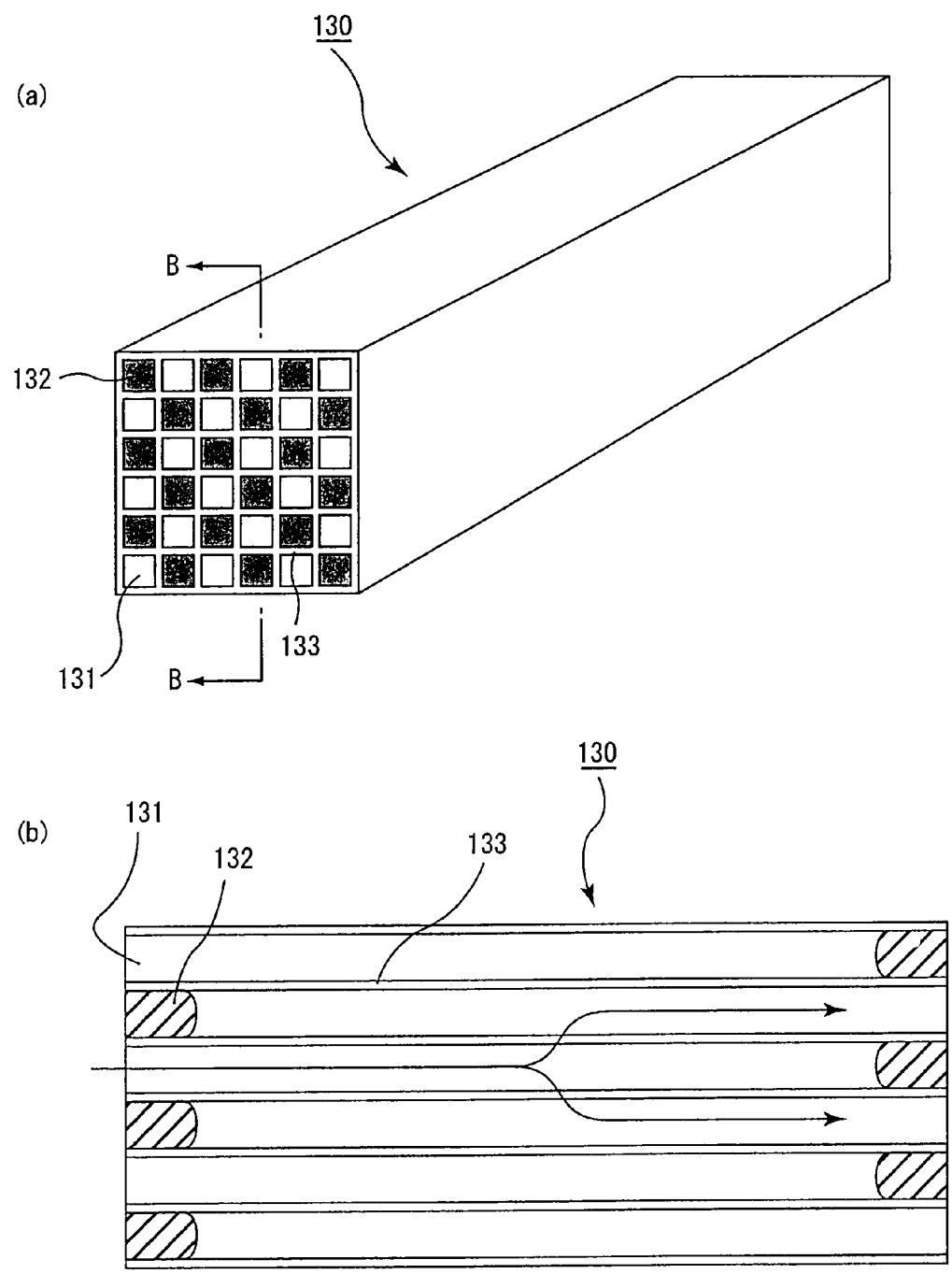
FIG. 8(a) is a perspective view schematically showing a ceramic member contained in the conventional honeycomb structural body.
FIG. 8(b) is a cross-sectional view taken along line B-B of FIG. 8(a).
Figure 9:
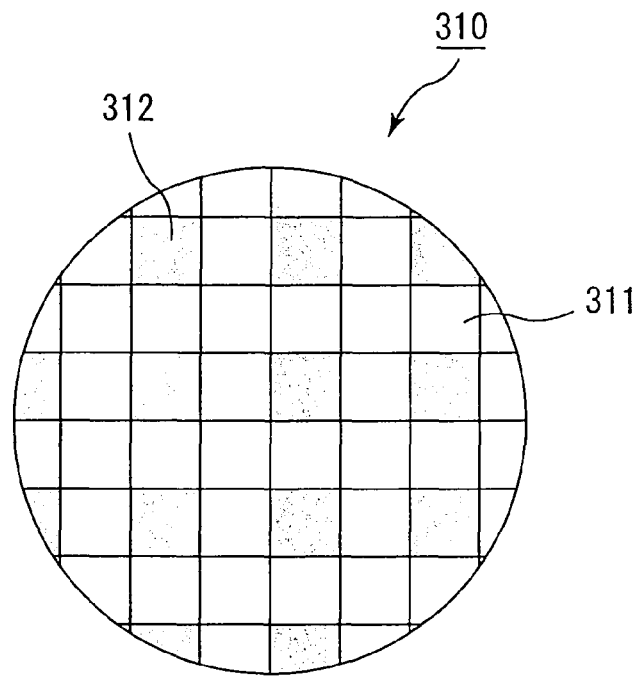
FIG. 9 schematically shows a cross-section perpendicular to a length direction of an exhaust gas filter.
Figure 10:
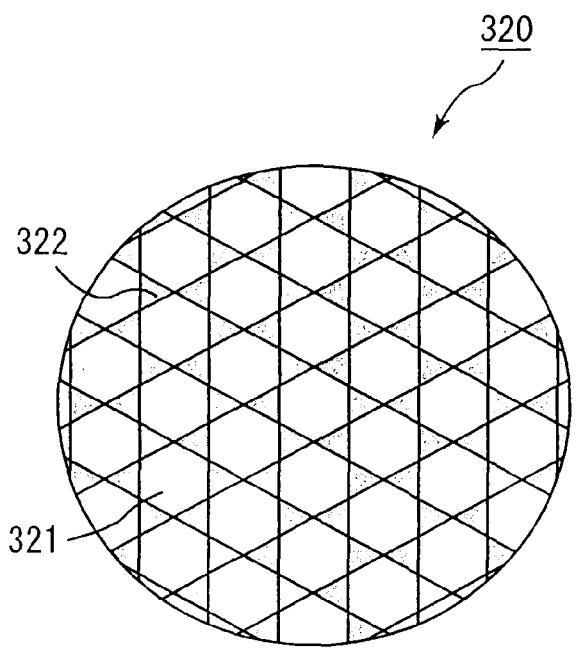
FIG. 10 schematically shows a cross-section perpendicular to the length direction of the exhaust gas filter.
Figure 11:
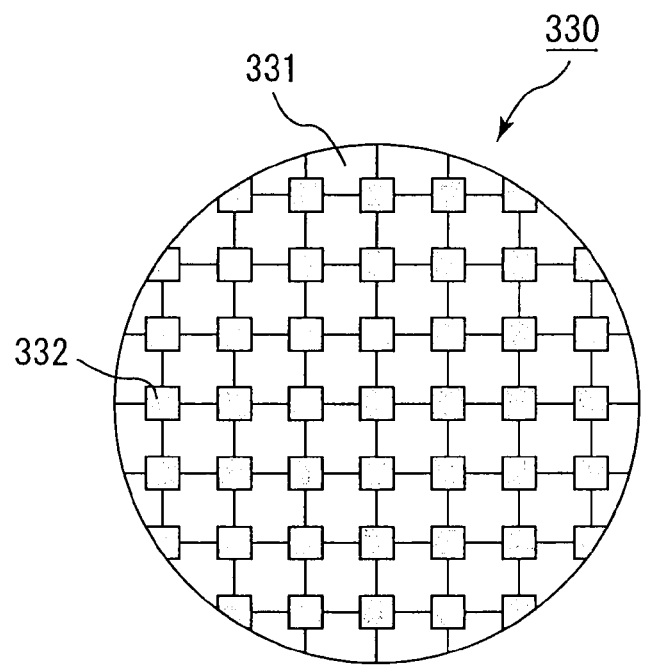
FIG. 11 schematically shows a cross-section perpendicular to the length direction of the exhaust gas filter.
Figure 12:
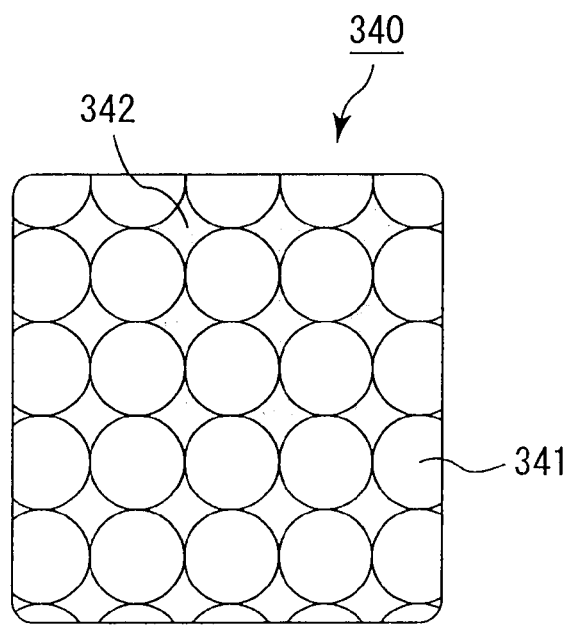
FIG. 12 schematically shows a cross-section perpendicular to the length direction of the exhaust gas filter.
Figure 13:
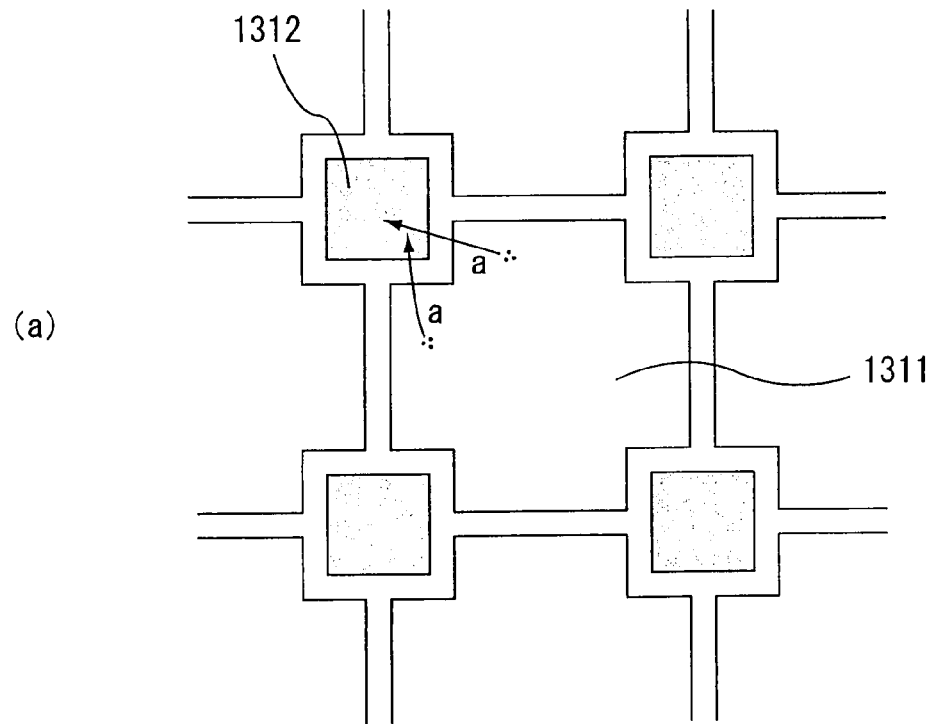
FIGS. 13(a) and 13(b) are schematic diagrams for describing exhaust gas flow paths in a conventional filter.
Figure 13:
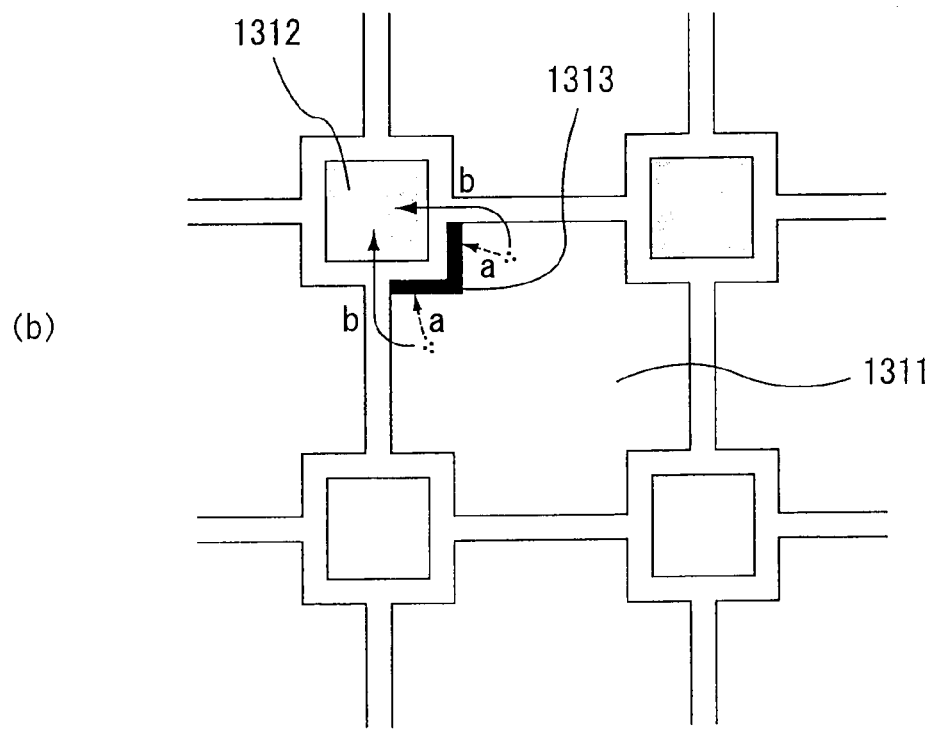
Figure 14:
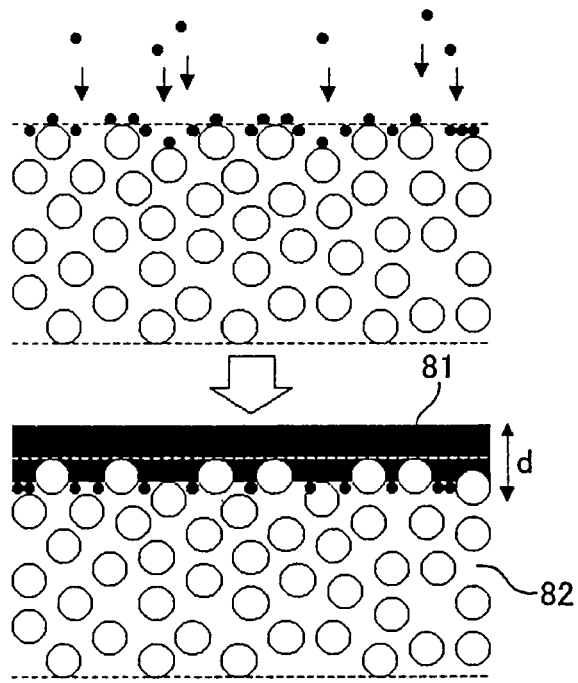
FIG. 14 is a conceptual diagram schematically showing the thickness of particulates when the particulates have been deposited on a wall portion in the honeycomb structural body of the present invention.
Figure 15:
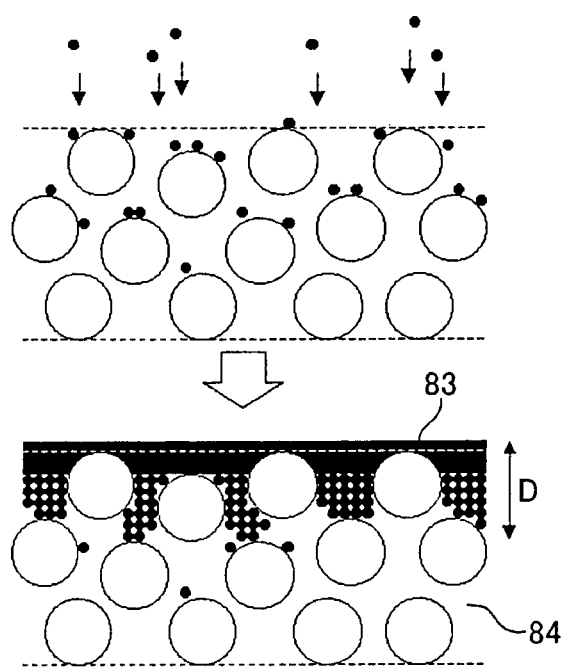
FIG. 15 is a conceptual diagram schematically showing the thickness of particulates when the particulates have been deposited on a wall portion in a conventional filter.

EXPLANATION OF SYMBOLS 10, 30 honeycomb structural body
13, 14 sealing material layer
15, 35 ceramic block
20, 40, 50, 70 porous ceramic member
21a, 31a, 41a, 51a, 71a gas flow-in through hole
21b, 31b, 41b, 51b, 71b gas flow-out through hole
22, 32 plug
23, 43, 53, 73 wall portion (partition wall)
33 wall portion
160, 170, 180, 260, 270, 280 honeycomb structural body
161a, 171a, 181a, 261a, 271a, 281a gas flow-in through hole
161b, 171b, 181b, 261b, 271b, 281b gas flow-out through hole
163, 173, 183, 263, 273, 283 wall portion

What is claimed is:

1. A columnar honeycomb structural body, comprising:
a porous ceramic block having a plurality of through holes and a wall portion interposed between the through holes, the through holes extending in parallel with one another in a length direction of the porous ceramic block,
wherein the through holes have one of ends sealed such that an opening area of one end face of the through holes is larger than an opening area of the other end face of the through holes, the plurality of through holes includes a plurality of large through holes sealed on the one end face and a plurality of small through holes sealed on the other end face, the large through holes have cross-section areas which are larger than cross-section areas of the small through holes, the large through holes and the small through holes are positioned such that the wall portion includes a plurality of partition wall portions each of which is interposed between two adjacent large through holes of the large through holes and a plurality of partition wall portions each of which is interposed between adjacent large through hole and small through hole of the large and small through holes, that each of the partition wall portions between the two adjacent large through holes is defined by two adjacent sides of the two adjacent large through holes, that each of the partition wall portions between the adjacent large and small through holes is defined by two adjacent sides of the adjacent large and small through holes, and that a distance between centers of gravity of the cross-section areas of adjacent ones of the large through holes is set to be equal to a distance between centers of gravity of the cross-section areas of adjacent ones of the small through holes, each of the partition wall portions between the adjacent large and small through holes has a length which is greater than a length of each of the partition wall portions between the two adjacent large through holes, the opening area of the one end face of the through holes and the opening area of the other end face of the through holes have a ratio in a range between 1.01 to 6, the wall portion has a plurality of micro pores having an average pore diameter in a range from 5 to 30 μm, the micro pores include large micro pores having a pore diameter two or more times larger than the average pore diameter, and the large micro pores have a capacity of which a rate is set to 30% or less of a capacity of the micro pores in entirety.

2. The honeycomb structural body according to claim 1, wherein the opening area on a gas inlet side is made larger than the opening area on a gas outlet side.

3. The honeycomb structural body according to claim 1, wherein each of the large through holes has an octagonal cross-section shape and each of the small through holes has a quadrangle cross-section shape.

4. The honeycomb structural body according to claim 1, wherein the wall portion has a porosity in a range from 30 to 70%.

5. The honeycomb structural body according to claim 1, wherein the plurality of through holes on a cross-section perpendicular to the length direction has a density in a range from 15.5 to 62.0 pcs/cm$^2$.

6. The honeycomb structural body according to claim 1, wherein the porous ceramic block comprises silicon carbide.

7. The honeycomb structural body according to claim 1, wherein the wall portion has a thickness in a range from 0.1 to 0.5 mm.

8. An exhaust gas purifying device for a vehicle, comprising the honeycomb structural body according to claim 1.

9. The honeycomb structural body according to claim 2, wherein the wall portion has a porosity in a range from 30 to 70%.

10. The honeycomb structural body according to claim 2, wherein the plurality of through holes on a cross-section perpendicular to the length direction has a density in a range from 15.5 to 62.0 pcs/cm$^2$.

11. The honeycomb structural body according to claim 2, wherein the porous ceramic block comprises silicon carbide.

12. The honeycomb structural body according to claim 2, wherein the wall portion has a thickness in a range from 0.1 to 0.5 mm.

13. An exhaust gas purifying device for a vehicle, comprising the honeycomb structural body according to claim 2.

14. The honeycomb structural body according to claim 4, wherein the plurality of through holes on a cross-section perpendicular to the length direction has a density in a range from 15.5 to 62.0 pcs/cm$^2$.

15. The honeycomb structural body according to claim 4, wherein the porous ceramic block comprises silicon carbide.

16. The honeycomb structural body according to claim 4, wherein the wall portion has a thickness in a range from 0.1 to 0.5 mm.

17. An exhaust gas purifying device for a vehicle, comprising the honeycomb structural body according to claim 4.

18. The honeycomb structural body according to claim 5, wherein the porous ceramic block comprises silicon carbide.

19. The honeycomb structural body according to claim 5, wherein the wall portion has a thickness in a range from 0.1 to 0.5 mm.

20. An exhaust gas purifying device for a vehicle, comprising the honeycomb structural body according to claim 5.

* * * * *